United States Patent
Medbo

(10) Patent No.: US 9,106,457 B2
(45) Date of Patent: Aug. 11, 2015

(54) MODIFIED MAXIMUM LIKELIHOOD CHANNEL ESTIMATION

(75) Inventor: Jonas Medbo, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/007,081

(22) PCT Filed: Apr. 14, 2011

(86) PCT No.: PCT/SE2011/050461
§ 371 (c)(1),
(2), (4) Date: Sep. 24, 2013

(87) PCT Pub. No.: WO2012/141632
PCT Pub. Date: Oct. 18, 2012

(65) Prior Publication Data
US 2014/0010274 A1 Jan. 9, 2014

(51) Int. Cl.
*H04L 25/02* (2006.01)
*H04B 17/24* (2015.01)
*H04B 17/373* (2015.01)
*G01S 3/74* (2006.01)

(52) U.S. Cl.
CPC ............ *H04L 25/0242* (2013.01); *H04B 17/24* (2015.01); *H04B 17/373* (2015.01); *G01S 3/74* (2013.01); *H04L 25/0204* (2013.01)

(58) Field of Classification Search
CPC ................................ H04L 27/28; H04L 27/01
USPC ................................................. 375/260, 267
See application file for complete search history.

(56) References Cited

U.S. PATENT DOCUMENTS

2008/0267304 A1* 10/2008 Chong et al. .................. 375/260
2013/0107733 A1* 5/2013 Yin ............................... 370/252

OTHER PUBLICATIONS

Fleury et al ("Channel parameter estimation in mobile radio environments using the SAGE algorithm," Selected Areas in Communications, IEEE Journal on , vol. 17, No. 3, pp. 434,450, Mar. 1999.).*
Borah, Deva K. et al., "Frequency-Selective Fading Channel Estimation with a Polynomial Time-Varying Channel Model," IEEE Transactions on Communications, vol. 47, No. 6, Jun. 1999, pp. 862-873.

(Continued)

*Primary Examiner* — Jaison Joseph
(74) *Attorney, Agent, or Firm* — Withrow & Terranova, PLLC

(57) ABSTRACT

The present technology relates to a channel estimator configured to operate based on a discrete wave channel model and measured channel responses between a transmitter having at least one transmit antenna and a receiver having at least one receive antenna. The channel estimator comprises a windowed likelihood determiner and a maximization processor. The windowed likelihood determiner is configured to determine a windowed likelihood function based on the measured channel responses, a selected window function, and modeled channel responses defined based on a number of discrete waves according to the discrete wave channel model. The maximization processor is configured to perform maximization of the windowed likelihood function, using initial input in the form of at least one of predetermined wave propagation delay(s) and predetermined wave propagation direction(s) for at least one of the discrete waves, to extract the wave parameters of the discrete waves.

27 Claims, 18 Drawing Sheets

(56) References Cited

OTHER PUBLICATIONS

Dagres, Ioannis et al., "Decision-Directed Least-Squares Phase Perturbation Compensation in OFDM Systems," IEEE Transactions on Wireless Communications, vol. 8, No. 9, Sep. 2009, pp. 4784-4796.

Guvenc, Ismail et al., "Enhancements to Linear Least Squares Localization Through Reference Selection and ML Estimation," WCNC 2008 Wireless Communications and Networking Conference, Copyright: 2008, pp. 284-289.

International Search Report and Written Opinion for PCT/SE2011/050461, mailed Jan. 30, 2012, 11 pages.

Materum, Lawrence et al., "Polarimetric Beamforming Comparison of the Multipath Clusterization of ML Estimates and the Measurement Data of a MIMO Macrocell Channel," 2009 IEEE 20th International Symposium on Personal, Indoor and Mobile Radio Communications, Copyright: 2009, pp. 2843-2846.

Richter, Andreas et al., "Joint Maximum Likelihood Estimation of Specular Paths and Distributed Diffuse Scattering," 2005 IEEE 61st Vehicular Technology Conference, vol. 1, Copyright: 2005, pp. 11-15.

Richter, Andreas et al., "Maximum Likelihood Channel Parameter Estimation from Multidimensional Channel Sounding Measurements," The 57th IEEE Semiannual Vehicular Technology Conference, vol. 2, Copyright: 2003, pp. 1056-1060.

Taparugssanagorn, A. et al., "Impact of Channel Sounder Phase Noise on Directional Channel Estimation by Space-Alternating Generalised Expectation Maximisation," The Institution of Engineering and Technology Microwave Antennas Propaganda, vol. 1, No. 3, Copyright: 2007, pp. 803-808.

Thoma, Reiner S. et al., "Multidimensional High-Resolution Channel Sounding in Mobile Radio," 2004 Instrumentation and Measurement Technology Conference (IMTC 2004), May 18-20, 2004, pp. 257-262, Como, Italy.

\* cited by examiner

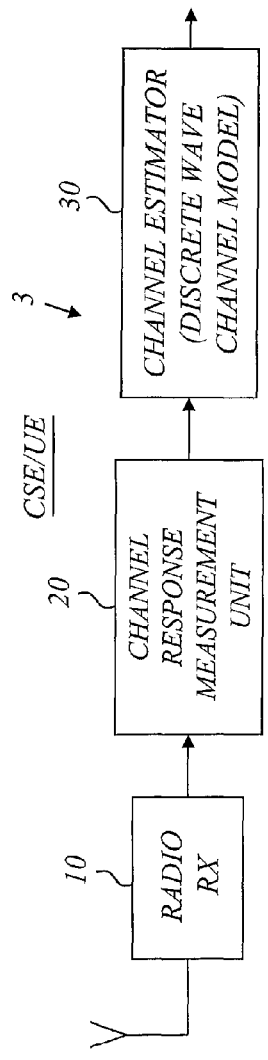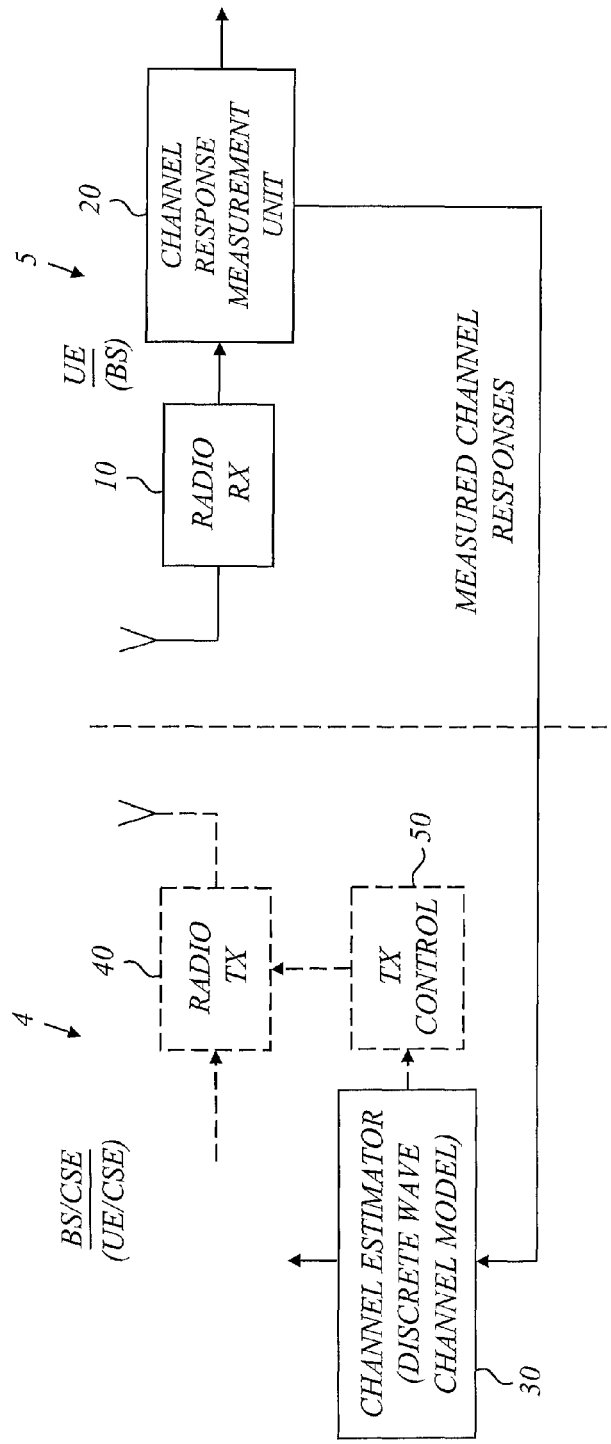
Fig. 2A
Fig. 2B

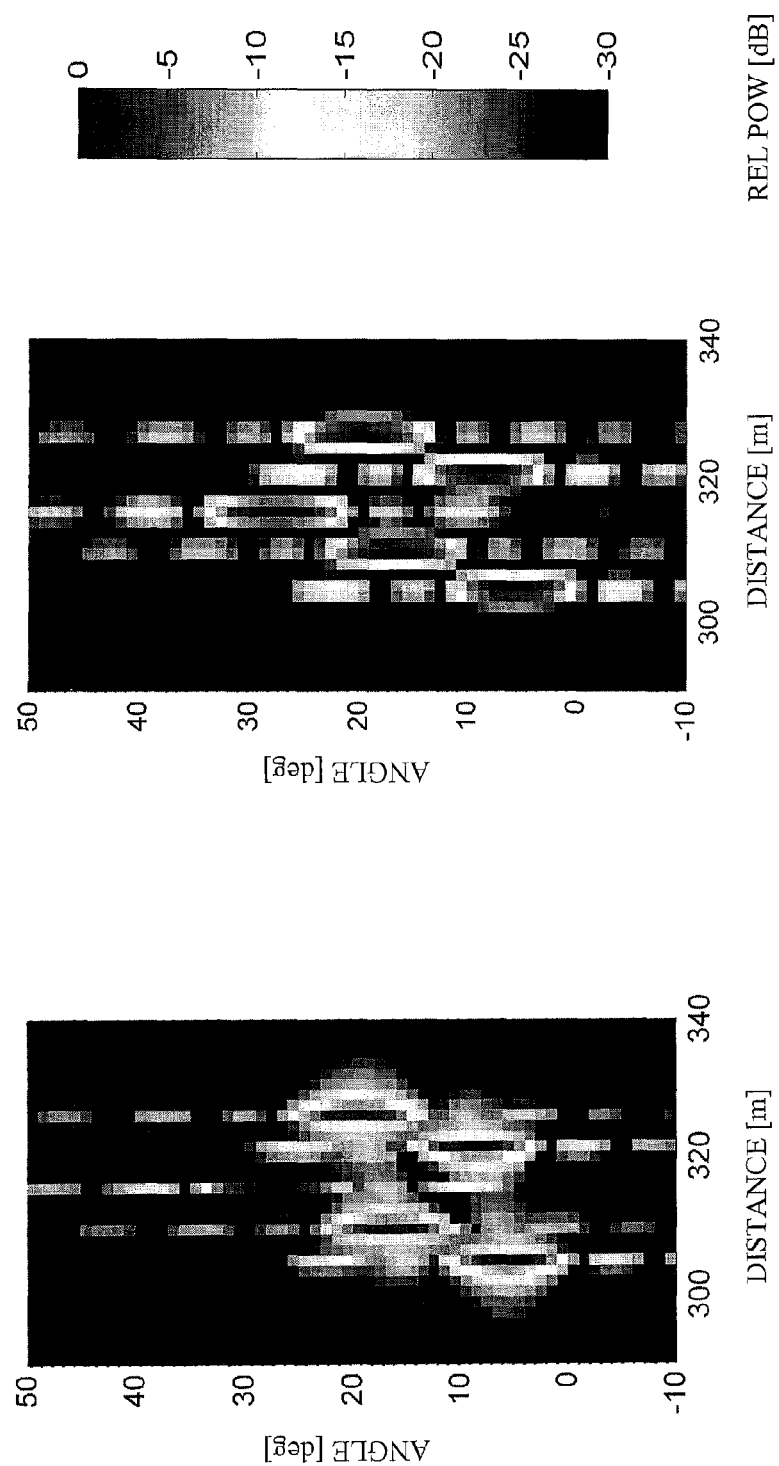

MODIFIED MAXIMUM LIKELIHOOD CHANNEL ESTIMATION

This application is a 35 U.S.C. §371 national phase filing of International Application No. PCT/SE2011/050461, filed Apr. 14, 2011, the disclosure of which is incorporated herein by reference in its entirety.

TECHNICAL FIELD

The invention generally relates to radio technology and more particularly to channel estimation based on a discrete wave channel model and channel measurements.

BACKGROUND

The design of modern and future wireless radio communication technologies requires radio interfaces that are characterized by high bandwidth efficiency and flexibility. Advanced signal processing, especially when combined with the use of multiple antennas, is commonly understood to enhance the performance in terms of coverage, capacity and/or quality of service. Knowledge of the radio channel is of vital importance in any wireless communication system, e.g. for channel modeling in radio link and system simulations, channel prediction and possible link adaptation.

An advanced approach for channel estimation is based on discrete wave channel modeling involving a number of discrete waves, combined with Maximum Likelihood (ML) parameter estimation. The main use of discrete wave channel estimation and modeling of the multiple channels is to accurately characterize the channels from channel measurements and to use this characterization for channel modeling in radio link and system simulations. Extensive efforts have been put on measurement campaigns and characterization of the radio channel to provide input to 3GPP (3$^{rd}$ Generation Partnership Project), COST (COperation européenne dans le domaine de la recherche Scientifique et Technqiue) 259, COST 273, COST 2100, ITU (International Telecommunication Union), ETSI (European Telecommunications Standards Institute) and other channel modeling efforts. Another use of highly resolved channel estimation is improved channel prediction, which in turn can be used for enhanced link adaptation including controlling coding and/or transmit power.

It is well known that Maximum Likelihood in principle is one of the most accurate methods available. It suffers however from considerable computational complexity. The basic problem is that maximization is not feasible with respect to all waves and the corresponding parameters simultaneously. Different methods have previously been proposed for complexity reduction like Space Alternating Generalized Expectation (SAGE) maximization, and a maximum likelihood framework called RIMAX [1]. The problem with SAGE is that the convergence is very slow when the estimated parameters are dependent on each other. This problem is to a large extent solved with RIMAX which uses a gradient based method to find a local maximum. The problem with RIMAX is however that all parameters in principle have to be estimated simultaneously. Though the convergence is much faster it is still not feasible to handle the number of waves which in most practical cases may be several hundreds. For RIMAX this is solved by identifying groups of uncoupled waves and performing sequential maximization for parameters within these groups. It is however difficult, and often not even possible, to find uncoupled groups of waves, i.e. groups of waves with no or low correlation and/or with no or low power overlap.

There is thus a general need for improved techniques for channel estimation.

SUMMARY

It is a general object to provide an improved channel estimation technique.

It is an object to provide an improved method of channel estimation.

It is another object to provide an improved channel estimator.

It is also an object to provide a unit comprising an improved channel estimator.

In a first aspect, there is provided a method of channel estimation based on a discrete wave channel model and measured channel responses between a transmitter having at least one transmit antenna and a receiver having at least one receive antenna. A basic idea is to determine a windowed likelihood function based on the measured channel responses, a selected window function, and modeled channel responses defined based on a number of discrete waves according to the discrete wave channel model. Each one of the discrete waves is associated with wave parameters to be determined including at least one of wave propagation direction(s) and wave propagation delay. Subsequently, maximization of the windowed likelihood function is performed, using initial input in the form of at least one of predetermined wave propagation delay(s) and predetermined wave propagation direction(s) for at least one of the discrete waves, to determine the wave parameters of the discrete waves.

The use of a windowed likelihood function enables a more efficient and accurate estimation of the wave parameters.

In a second aspect, there is provided a channel estimator configured to operate based on a discrete wave channel model and measured channel responses between a transmitter having at least one transmit antenna and a receiver having at least one receive antenna. Basically, the channel estimator comprises a windowed likelihood determiner and a maximization processor. The windowed likelihood determiner is configured to determine a windowed likelihood function based on the measured channel responses, a selected window function, and modeled channel responses defined based on a number of discrete waves according to the discrete wave channel model. Each one of the discrete waves is associated with wave parameters to be determined including at least one of wave propagation direction(s) and wave propagation delay. The maximization processor is configured to perform maximization of the windowed likelihood function, using initial input in the form of at least one of predetermined wave propagation delay(s) and predetermined wave propagation direction(s) for at least one of the discrete waves, to extract the wave parameters of the discrete waves.

In this way, an efficient and accurate channel estimator is obtained.

In another aspect, there is provided a unit that comprises such a channel estimator.

Other advantages offered by the present technology will be appreciated when reading the below detailed description.

BRIEF DESCRIPTION OF THE DRAWINGS

The invention, together with further objects and advantages thereof, may best be understood by making reference to the following description taken together with the accompanying drawings, in which:

FIG. 2A is a schematic diagram illustrating an example of a unit having a channel estimator operating based on a discrete wave channel model, using channel responses measured by the unit itself.

FIG. 2B is a schematic diagram illustrating an example of a unit having a channel estimator operating based on a discrete wave channel model, using measured channel responses obtained from one or more other units.

FIG. 11A illustrates the average power delay profile (PDP) for L, FIG. 11B illustrates the average power delay profile (PDP) for $L_{mod}$, and FIG. 11C illustrates the estimation error for angle $\phi_1$.

FIG. 12A illustrates the average power delay profile (PDP) for L, FIG. 12B illustrates the average power delay profile (PDP) for $L_{mod}$, and FIG. 12C illustrates the estimation error for angle $\phi_1$.

FIGS. 15A-B are schematic diagram illustrating an example of the results of estimation by beamforming.

DETAILED DESCRIPTION

Throughout the drawings, the same reference numbers are used for similar or corresponding elements.

Figure 1:
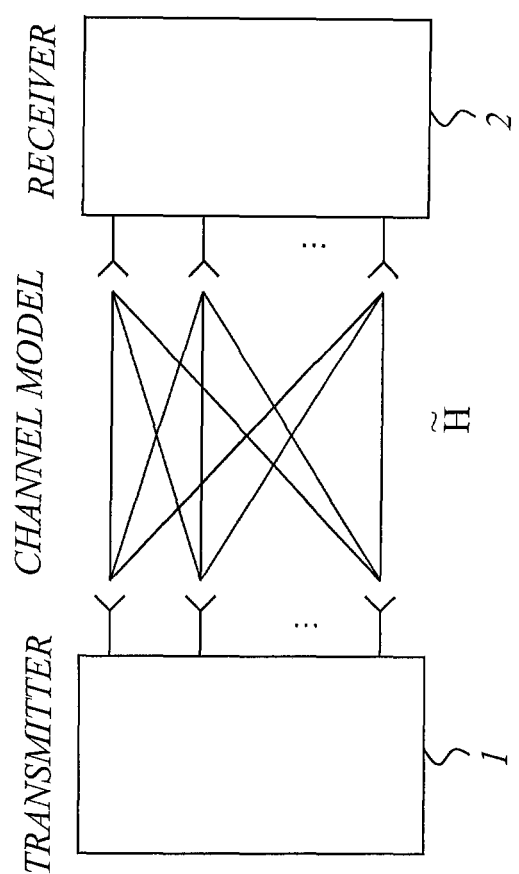
FIG. 1 is a schematic diagram illustrating an example of a channel model, where a transmitter has one or more transmit antennas and a receiver has one or more receive antennas.

FIG. 1A schematically illustrates an example of a radio channel, where a transmitter 1 has one or more transmit antennas and a receiver 2 has one or more receive antennas. In matrix form, the channel can be expressed as:

$$y = Hx + \sigma$$

where y is the received signal vector, H is a complex channel matrix, x is the transmitted signal vector, $\sigma$ is a vector representation of noise. The elements of the complex channel matrix H can be written as $H_{mn}$, which represents the "channel" between transmit antenna m and receive antenna n. The number $N_{tx}$ of transmit antennas can vary from 1 and up, and the number $N_{rx}$ of receive antennas can also vary from 1 and up. Expressed mathematically: $N_{tx} \geq 1$, and $N_{rx} \geq 1$. The following methodology is thus valid for Single-Input Single-Output (SISO), Single-Input Multiple-Output (SIMO), Multiple-Input Single-Output (MISO) and Multiple-Input Multiple-Output (MIMO) antenna cases.

Typically, channel measurements can be made based on known reference symbols, also referred to as pilot signals or more generally as channel estimation signals. When channel measurements are performed, the elements $H_{mn}$ are sometimes referred to as channel estimates, and each element can be considered as representing a measured channel response. It should be understood that normally the antennas are considered as part of the channel(s).

When considering a discrete wave channel model, these measured channel responses can then be used as input to determine so-called wave parameters associated with a number of discrete waves that describe the channel(s) in a better and more accurate manner, e.g. suitable for channel prediction and/or simulation purposes.

FIG. 2A is a schematic diagram illustrating an example of a unit having a channel estimator operating based on a discrete wave channel model, using measured channel responses obtained by the unit itself. In this particular example, the unit 3 comprises, among other standard radio components, a standard radio receiver (RX) 10, a channel response measurement unit 20, and a channel estimator 30 operating based on a discrete wave channel model. The channel response measurement unit 20 is sometimes also referred to as a channel estimator, but, compared to the channel estimator 30, the channel response measurement unit 20 normally only operates to more or less directly provide measured channel responses based on known reference symbols. The measured channel responses can for example be represented in frequency, time/delay, code and/or space. The channel estimator 30, however, operates based on a discrete wave channel model and makes use of the measured channel responses from the channel response measurement unit 20 to determine wave parameters associated with a number of discrete waves. The unit 3 may for example be a channel sounding equipment (CSE) or a user equipment (UE).

FIG. 2B is a schematic diagram illustrating an example of a unit having a channel estimator operating based on a discrete wave channel model, using measured channel responses obtained from one or more other units. For example, the unit 4 may be a base station (BS) or a channel sounding equipment (CSE), and the unit 5 may be a user equipment. Alternatively, the unit 4 may be a user equipment, and the unit 5 may be a base station, or both units 4 and 5 may be channel sounding equipment. The unit 4 basically comprises a channel estimator 30 operating based on a discrete wave channel model. The channel estimator 30 also operates based on measured channel responses obtained from one or more other units such as unit 5. The unit 5 comprises at least a radio receiver (RX) 10 and a channel response measurement unit 20, and can transfer the measured channel responses to the unit 4, e.g. via a radio control interface. The unit 4 can then receive the measured channel responses, e.g. via the radio control interface.

Optionally, the unit 4 also comprises a standard radio transmitter (TX) 40 and a transmitter (TX) control unit 50 for controlling the radio transmitter 40. For example, the channel estimator 30 may then be used for channel prediction, using the discrete wave channel model for channel extrapolation in time to provide an updated channel prediction that can be used by the transmitter control unit 50 for link adaptation, e.g. controlling the coding and/or transmit power used by the radio transmitter 40 in response to the channel prediction.

As previously mentioned, the problem of optimizing discrete wave channel modeling by means of Maximum Likelihood techniques is well known.

In general, for a fixed set of measurement data and an underlying probability model, the technique of Maximum Likelihood selects values of the model parameters that produce the probability distribution most likely to have resulted in the observed data (i.e. the parameters that maximize the likelihood function).

General information on channel estimation based on a discrete wave channel model using Maximum Likelihood techniques can be found in reference [1]. A review of radio channel sounding techniques can also be found in reference [2]. It is also well known that the corresponding computational complexity is huge. The complexity problem has been treated before and partly solved by methods like SAGE and RIMAX [1].

However, serious accuracy and efficiency problems remain with the prior art solutions. The modified likelihood technique proposed in the present application solves these problems to a large extent as it demonstrates substantial improvements regarding computational efficiency and/or parameter estimate accuracy.

Figure 3:
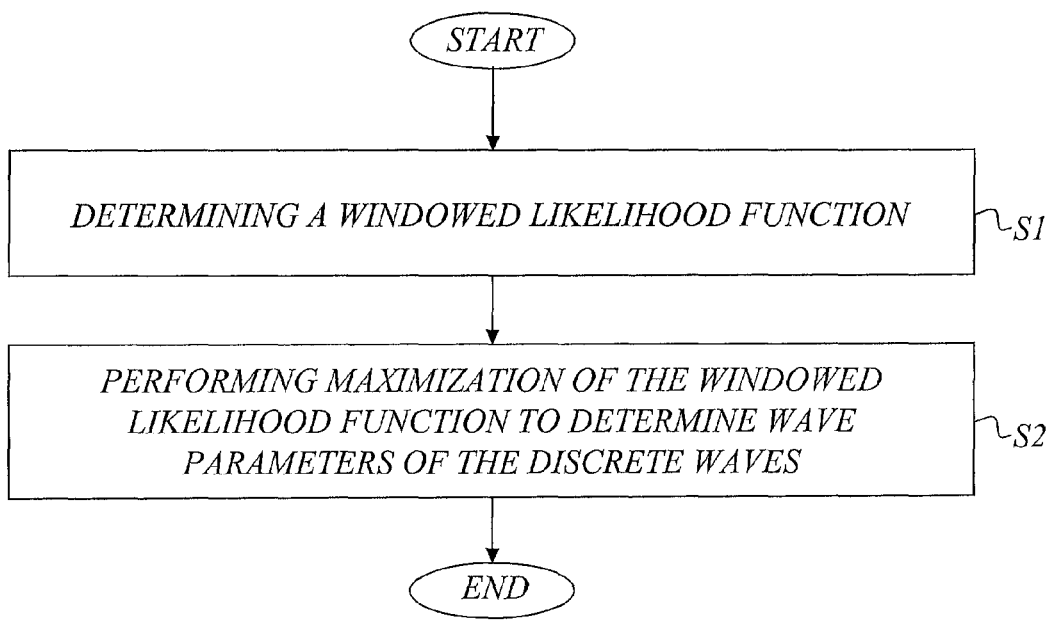
FIG. 3 is a schematic flow diagram illustrating an example of a method of channel estimation according to an embodiment.

FIG. 3 is a schematic flow diagram illustrating an example of a method of channel estimation according to an embodiment. The method is based on a discrete wave channel model and measured channel responses between a transmitter having at least one transmit antenna and a receiver having at least one receive antenna. Step S1 includes determining a windowed likelihood function based on the measured channel responses, a selected window function, and modeled channel responses defined based on a number of discrete waves according to the discrete wave channel model. Each one of the discrete waves is associated with wave parameters to be determined including at least one of wave propagation direction(s) and wave propagation delay. Step S2 includes performing maximization of the windowed likelihood function, using initial input in the form of at least one of predetermined wave propagation delay(s) and predetermined wave propagation direction(s) for at least one of the discrete waves, to determine the wave parameters of the discrete waves.

The use of a windowed likelihood function enables a more efficient and accurate estimation of the wave parameters. The window function is preferably designed such that waves being separated by a certain distance in at least one of wave propagation delay and wave propagation direction are substantially decoupled. Decoupled waves implies that the waves have no or low correlation and/or no or low power overlap. The windowing thus makes it possible to find independent or decoupled groups of waves, which is beneficial with respect to both accuracy and computational efficiency.

It should be understood that the expression "wave propagation direction(s)" implies "wave propagation direction or directions", and the expression "wave propagation delay(s)" implies "wave propagation delay or delays".

Any of a wide variety of window functions can be used, tailored to the specific application. Normally, the window function is non-rectangular. Preferably, the window function is defined as a bell-shaped curve, although other types of windows such as triangular windows are also feasible. Examples of suitable window functions include a Hanning window, a Blackman Harris window and a Gauss window. Some general information on windows and the use of windows for the specific purpose of harmonic analysis with the discrete Fourier transform can be found in reference [3].

An example of a modified/windowed log likelihood function is given by $$-\log L_{mod} = \frac{1}{\sigma^2} \sum_{q=1}^{N_q} \left\| \tilde{h}'_q - h'_q \right\|^2$$

where $\tilde{h}'_q = \tilde{h}_q \cdot w_q$ and $h'_q = h_q \cdot w_q$, and $\tilde{h}_q$ denotes the modeled channel responses defined based on the wave parameters according to the discrete wave channel model, $h_q$ denotes the measured channel responses, $\sigma^2$ is measurement noise power, $N_q$ is the number of measured channel responses, and $w_q$ windowing weights of the window function.

The above equation can be re-written as:

$$-\log L_{mod} = \frac{1}{\sigma^2} \sum_{q=1}^{N_q} \left\| \tilde{h}_q \cdot w_q - h_q \cdot w_q \right\|^2,$$

which is equivalent to:

$$-\log L_{mod} = \frac{1}{\sigma^2} \sum_{q=1}^{N_q} \left\| (\tilde{h}_q - h_q) \cdot w_q \right\|^2,$$

or $$-\log L_{mod} = \frac{1}{\sigma^2} \sum_{q=1}^{N_q} \left\| \tilde{h}_q - h_q \right\|^2 \cdot w_q^2.$$

These equations open up for different practical implementations of the windowed likelihood function. For example, it can be appreciated that the windowing weights $w_q$ may be applied directly to the measured and modeled channel responses, or to the differences between the measured and modeled channel responses.

In general, it is desirable to determine the number of discrete waves and at least one of the wave propagation direction(s) and wave propagation delay of each of these waves. Preferably, the complex amplitudes, described by a complex polarimetric amplitude matrix, for each of the discrete waves should also be determined.

For more detailed information on illustrative examples of the underlying discrete wave channel model, the windowing and the effect of windowing, reference is made to the enclosed Appendix.

To achieve substantial reduction in computational complexity while keeping high parameter estimate accuracy, the likelihood function is modified, for example by windowing the measurement data. The result is that the parameters of different waves are decoupled when the waves are sufficiently separated in the windowed parameter space.

Figure 4:
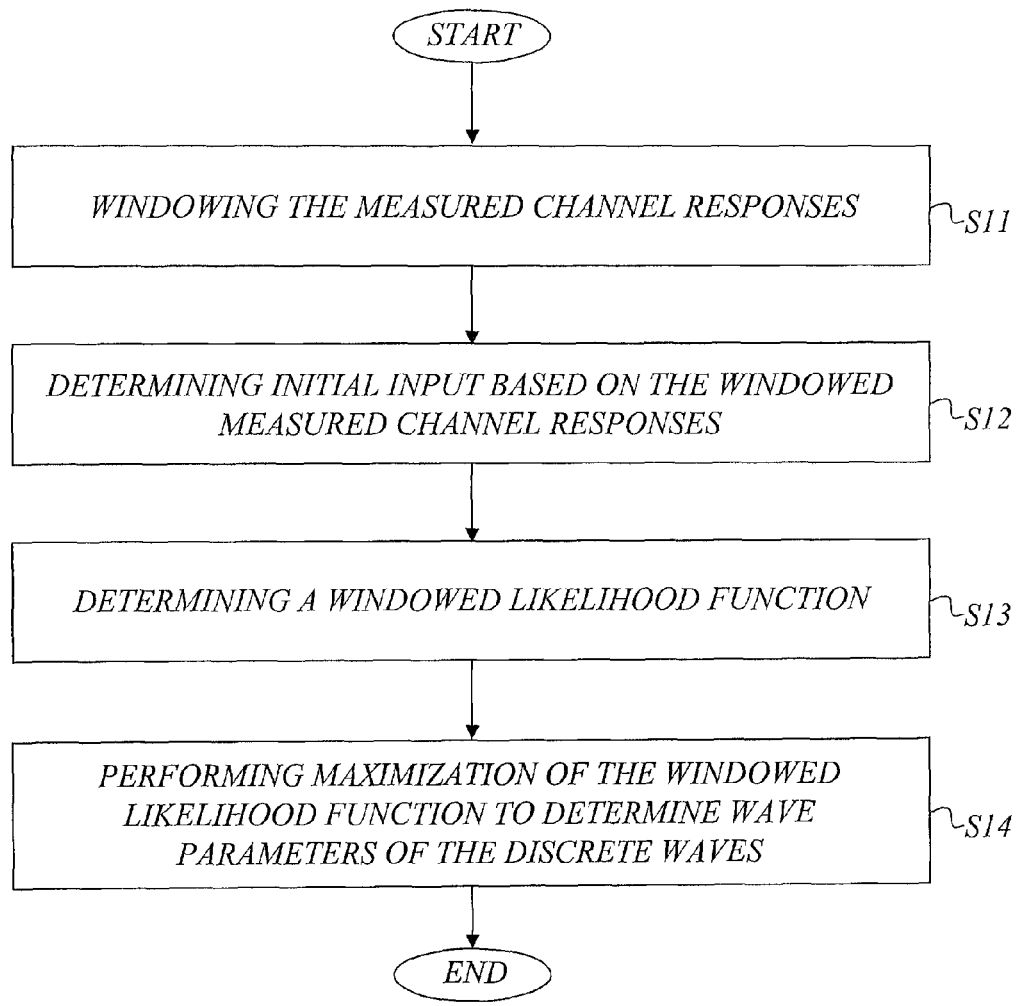
FIG. 4 is a schematic flow diagram illustrating an example of a method of channel estimation according to another embodiment.

FIG. 4 is a schematic flow diagram illustrating an example of a method of channel estimation according to another embodiment. In this example, the measured channel responses are windowed according to the window function to produce windowed measured channel responses in step S11. The initial input in the form of at least one of predetermined wave propagation delay(s) and predetermined wave propagation direction(s) for at least one of the discrete waves is determined based on the windowed measured channel responses in step S12. In the discrete wave channel model, the channel responses are also windowed according to the window function to produce windowed modeled channel responses, and the windowed likelihood function is determined in step S13 based on the windowed measured channel responses and the windowed modeled channel responses. The windowing of the modeled channel responses can be seen as part of the determining of the windowed likelihood function in step S13. Subsequently, maximization of the windowed likelihood function is performed to determine wave parameters of the discrete waves in step S14.

Further, the decoupling allows clipping of data outside the coupling distance. In practical cases, the complexity may be reduced hundredfold. Moreover, the convergence is very fast since one or only a few iterations are needed due to the decoupling.

Figure 5:
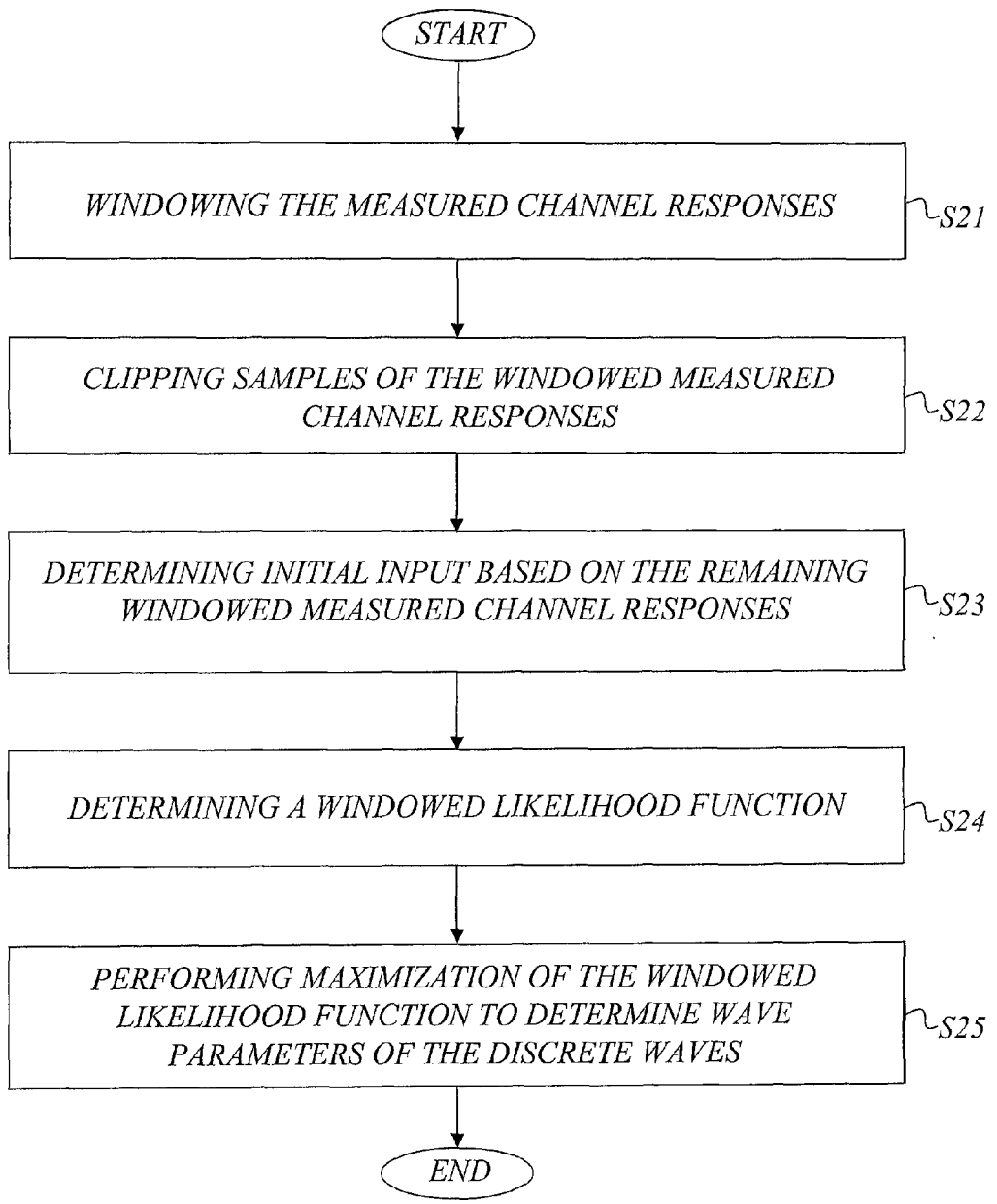
FIG. 5 is a schematic flow diagram illustrating an example of a method of channel estimation according to yet another embodiment.

FIG. 5 is a schematic flow diagram illustrating an example of a method of channel estimation according to yet another embodiment. In this example, the measured channel responses are windowed according to the window function to produce windowed measured channel responses in step S21. In step S22, samples of the windowed measured channel responses are clipped to produce remaining windowed measured channel responses. The initial input in the form of at least one of predetermined wave propagation delay(s) and predetermined wave propagation direction(s) for at least one of the discrete waves is determined based on the remaining windowed measured channel responses in step S23. In the model, the channel responses are also windowed according to the window function to produce windowed modeled channel responses, and the windowed likelihood function is determined in step S24 based on the remaining windowed measured channel responses and windowed modeled channel responses corresponding to the remaining windowed measured channel responses. The windowing of the modeled channel responses can be seen as part of the determining of the windowed likelihood function in step S24. It should also be understood that only windowed modeled channel responses corresponding to the remaining windowed measured channel response are needed to be defined in the windowed likelihood function. Subsequently, maximization of the windowed likelihood function is performed to determine wave parameters of the discrete waves in step S25.

Preferably, the remaining windowed measured channel responses are produced by clipping samples of the windowed measured channel responses that are decoupled with respect to the wave(s) that is/are subject to parameter estimation at the predetermined wave propagation delay(s) and/or predetermined wave propagation direction(s).

For example, the windowed measured channel responses may be represented in the frequency domain and transformed from the frequency domain into the delay domain, and the clipping in step S22 may be performed in the delay domain, and the remaining windowed measured channel responses may be transformed from the delay domain back to the frequency domain.

In another example, the windowed measured channel responses may be represented in the space domain and transformed from the space domain into the direction domain, and the clipping in step S22 may be performed in the direction domain, and the remaining windowed measured channel responses may be transformed from the direction domain back to the space domain.

It is shown that the number of samples needed in e.g. the delay domain is at the order of 10. Many practical cases of measurement data have more than 1000 samples in delay domain which means that the complexity may be reduced hundredfold.

In other words, the clipping basically corresponds to removal or elimination of measurement data.

For more detailed information on illustrative examples of clipping and the effects of clipping reference is made to the enclosed Appendix.

The windowed likelihood function may be approximated by a Taylor expansion thereof comprising terms up to and including second order terms before performing maximization of the windowed likelihood function. In this way, a closed form expression of the maximum of the windowed likelihood function is provided. This enables efficient maximization in the vicinity of a local maximum.

For more detailed information on an example of so-called local likelihood maximization by Taylor expansion reference is made to the enclosed Appendix.

It should be understood that once the windowed likelihood function has been determined, the maximization of the windowed likelihood function can be performed by means of any standard multivariate function maximization technique.

The maximization of the windowed likelihood function normally forms part of an overall channel estimation process, where a local maximum of a power profile with respect to at least one of the wave propagation delay and the wave propagation direction(s) is initially found. The initial input in the form of at least one of predetermined wave propagation delay and predetermined wave propagation direction(s) corresponds to such a local maximum of a power profile estimated with respect to at least one of the wave propagation delay and the wave propagation direction(s).

For example, a maximum in a windowed power delay profile may be determined in the initial phase. To determine a good guess of the initial directions of the discrete waves at the delay that corresponds to the maximum of the power delay profile, a so-called direction power function is formed and a number of local maxima with respect to direction are determined. Each such local maximum of the direction power function, which is above the noise level, corresponds to an initial wave to be determined with a higher accuracy through maximum likelihood optimization.

Alternatively, a maximum in a windowed power direction profile is determined in the initial phase. To determine a good guess of the initial delays of the discrete waves at the direction that corresponds to the maximum of the power direction profile, a so-called delay power function is formed and a number of local maxima with respect to delay are determined. Each such local maximum of the delay power function, which is above the noise level, corresponds to an initial wave to be determined with a higher accuracy through maximum likelihood optimization.

For more information on an example of an overall estimation process, reference can be made to the Appendix.

Figure 6:
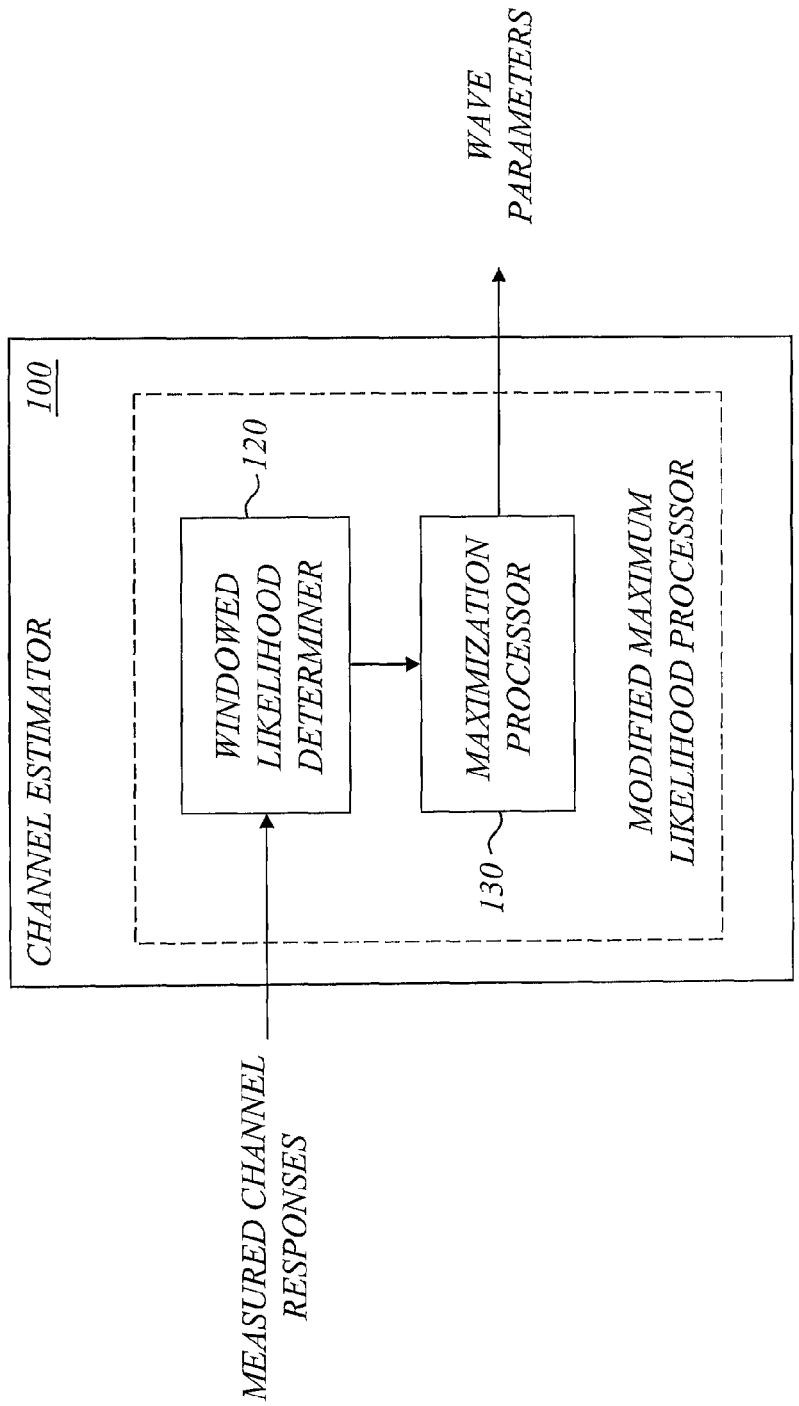
FIG. 6 is a schematic block diagram illustrating an example of a channel estimator according to an embodiment.

FIG. 6 is a schematic block diagram illustrating an example of a channel estimator according to an embodiment. The channel estimator 100 is configured to operate based on a discrete wave channel model and measured channel responses between a transmitter having at least one transmit antenna and a receiver having at least one receive antenna.

The channel estimator 100 basically comprises a windowed likelihood determiner 120 and a maximization processor 130. The windowed likelihood determiner 120 is configured to determine a windowed likelihood function based on the measured channel responses, a selected window function, and modeled channel responses defined based on a number of discrete waves according to the discrete wave channel model. Each one of the discrete waves is associated with wave parameters to be determined including at least one of wave propagation direction(s) and wave propagation delay. The maximization processor 130 is configured to perform maximization of the windowed likelihood function, using initial input in the form of at least one of predetermined wave propagation delay(s) and predetermined wave propagation direction(s) for at least one of the discrete waves, to extract the wave parameters of the discrete waves.

As previously indicated, the use of a windowed likelihood function enables a more efficient and accurate estimation of the wave parameters. The window function is preferably designed such that waves being separated by a certain distance in at least one of wave propagation delay and wave propagation direction are substantially decoupled. Any of a wide variety of window functions can be used, tailored to the specific application.

By way of example, the windowed likelihood determiner 120 is configured to determine the windowed likelihood function $L_{mod}$ by one of the following functions:

$$-\log L_{mod} = \frac{1}{\sigma^2}\sum_{q=1}^{N_q} \|\tilde{h}_q \cdot w_q - h_q \cdot w_q\|^2,$$

$$-\log L_{mod} = \frac{1}{\sigma^2}\sum_{q=1}^{N_q} \|(\tilde{h}_q - h_q)\cdot w_q\|^2,$$

$$-\log L_{mod} = \frac{1}{\sigma^2}\sum_{q=1}^{N_q} \|\tilde{h}_q - h_q\|^2 \cdot w_q^2,$$

where $\tilde{h}_q$ denotes the modeled channel responses defined based on the wave parameters according to the discrete wave channel model, $h_q$ denotes the measured channel responses, $\sigma^2$ is measurement noise power, $N_q$ is the number of measured channel responses, and $w_q$ are windowing weights of the window function.

Figure 7:
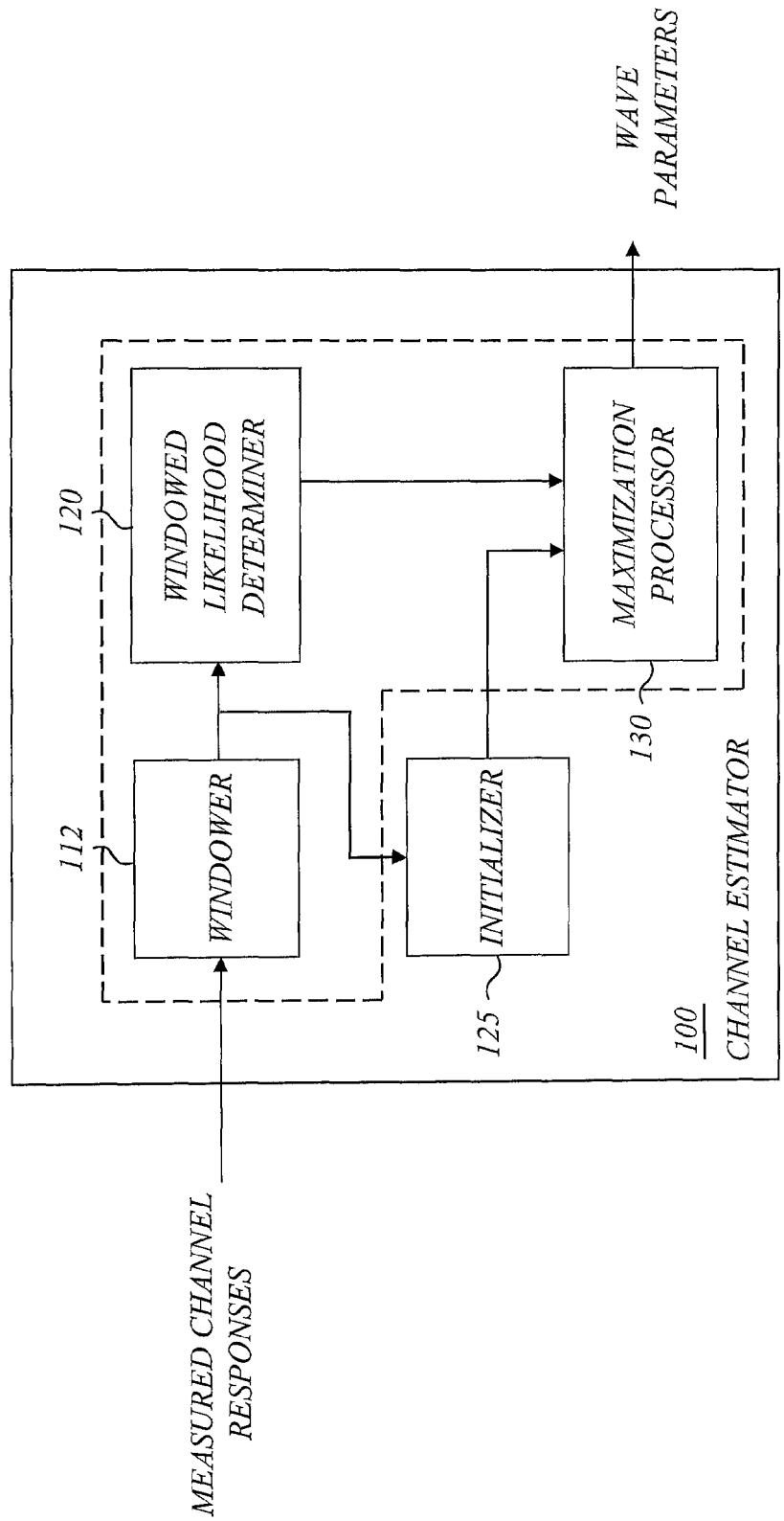
FIG. 7 is a schematic block diagram illustrating an example of a channel estimator according to another embodiment.

FIG. 7 is a schematic block diagram illustrating an example of a channel estimator according to another embodiment. The channel estimator 100 of FIG. 7 basically comprises a windower 112, a windowed likelihood determiner 120, an initializer 125 and a maximization processor 130. The windower 112 is configured to window the measured channel responses according to the window function to produce windowed measured channel responses, and the initializer 125 is configured to determine the initial input in the form of at least one of predetermined wave propagation delay(s) and predetermined wave propagation direction(s) for at least one of the discrete waves based on the windowed measured channel responses.

Preferably, the windowed likelihood determiner 120 is configured to window the modeled channel responses according to the window function to produce windowed modeled channel responses, and determine the windowed likelihood function based on the windowed measured channel responses and the windowed modeled channel responses. The maximization processor 130 is configured to perform maximization of the windowed likelihood function, using the initial input from the initializer 125, to extract the wave parameters of the discrete waves.

Figure 8:
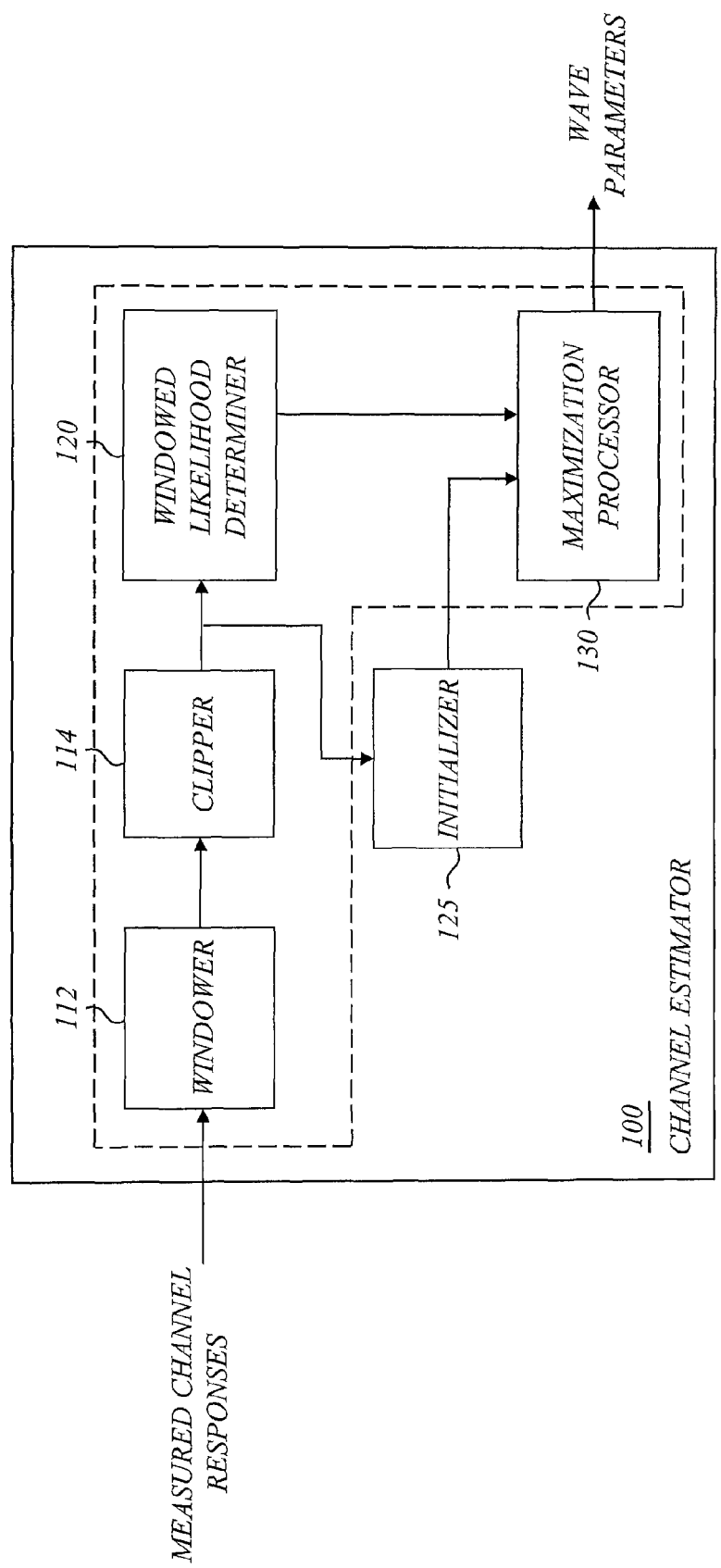
FIG. 8 is a schematic block diagram illustrating an example of a channel estimator according to yet another embodiment.

FIG. 8 is a schematic block diagram illustrating an example of a channel estimator according to yet another embodiment. The channel estimator 100 of FIG. 8 basically comprises a windower 112, a clipper 114, a windowed likelihood determiner 120, an initializer 125 and a maximization processor 130. The windower 112 is configured to window the measured channel responses according to the window function to produce windowed measured channel responses. The clipper 114 is configured for clipping samples of the windowed measured channel responses to produce remaining windowed measured channel responses. The initializer 125 is configured to determine the initial input in the form of at least one of predetermined wave propagation delay(s) and predetermined wave propagation direction(s) for at least one of the discrete waves based on the remaining windowed measured channel responses. The windowed likelihood determiner 120 is configured to window modeled channel responses according to the window function to produce windowed modeled channel responses, and to determine the windowed likelihood function based on the remaining windowed measured channel responses and windowed modeled channel responses corresponding to the remaining windowed measured channel responses. It should be understood that only windowed modeled channel responses corresponding to the remaining windowed measured channel response are needed to be defined in the windowed likelihood function.

The clipper 114 is preferably configured for clipping samples of the windowed measured channel responses that are decoupled with respect to the wave(s) at the predetermined wave propagation delay(s) and/or predetermined wave propagation direction(s).

The maximization processor 130 is configured to extract, for each of the discrete waves, wave parameters including at least one of wave propagation direction(s) and wave propagation delay. Preferably, the maximization processor 130 is also configured to extract, for each of the discrete waves, a complex polarimetric amplitude matrix that is included in the wave parameters.

For efficient maximization, the windowed likelihood determiner 120 is preferably configured to approximate the windowed likelihood function by a Taylor expansion thereof comprising terms up to and including second order terms. In this way, a closed form expression of the maximum of the windowed likelihood function is provided, as exemplified in the Appendix.

In another aspect, there is provided a unit that comprises a channel estimator according to the present technology. By way of example, the channel estimator of any of FIGS. 6-8 may be included in the unit 3 of FIG. 2A or the unit 4 of FIG. 2B. The unit may for example be a base station, a channel sounding equipment or a user equipment. The unit is normally a radio receiver/transmitter unit.

It will be appreciated that the methods and devices described above can be combined and re-arranged in a variety of ways, and that the methods can be performed by one or more suitably programmed or configured digital signal processors and other known electronic circuits, e.g. discrete logic gates interconnected to perform a specialized function, or application-specific integrated circuits.

Many aspects of the present technology are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device or unit in which the present technology is implemented. It may also be possible to re-use existing software, e.g. by reprogramming of the existing software or by adding new software components.

In the following, an example of a computer-implementation will be described with reference to FIG. 9.

Figure 9:
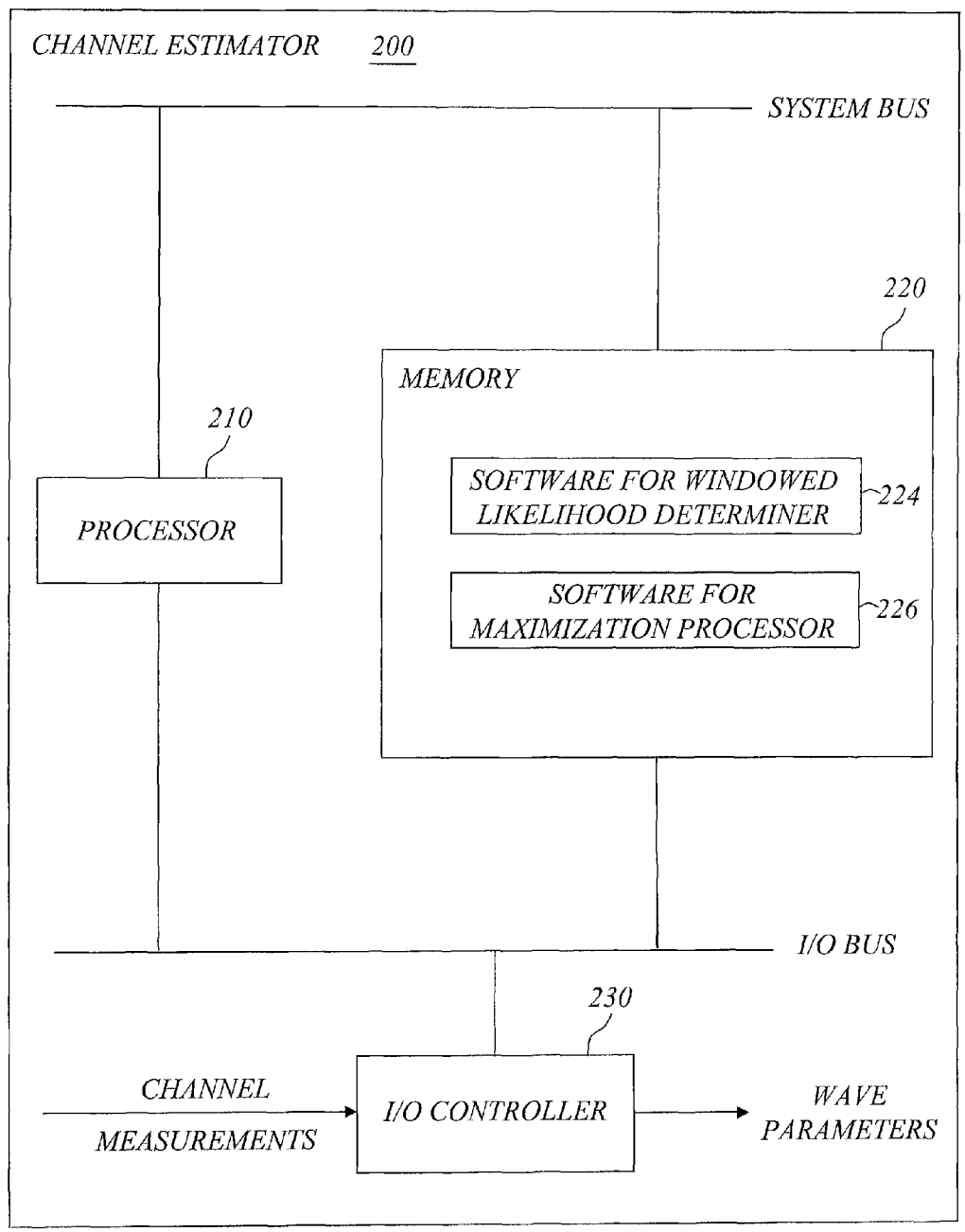
FIG. 9 is a schematic block diagram illustrating an example of a computer-implementation of a channel estimator according to an embodiment.

FIG. 9 is a schematic block diagram illustrating an example of a computer-implementation of a channel estimator according to an embodiment. The channel estimator 200 of this embodiment is based on a processor 210 such as a microprocessor or digital signal processor, a memory 220 and an input/output (I/O) controller 230. In this particular example, at least some of the steps, functions and/or blocks described above are implemented in software, which is loaded into memory 220 for execution by the processor 210. The processor 210 and the memory 220 are interconnected to each other via a system bus to enable normal software execution. The I/O controller 230 may be interconnected to the processor 210 and/or memory 220 via an I/O bus to enable input and/or output of relevant data such as input parameter(s) and/or resulting output parameter(s).

In this particular example, the memory 220 includes a number of software components 224 and 226. The software component 224 implements a windowed likelihood determiner corresponding to block 120 in the embodiments described above. The software component 226 implements a maximization processor corresponding to block 130 in the embodiments described above.

The I/O controller 230 is typically configured to receive channel measurements in the form of measured channel responses and transfer the received channel measurements to the processor 210 and/or memory 220 for use as input during execution of the software.

The resulting wave parameters may be transferred as output via the I/O controller 230. If there is additional software that needs the resulting wave parameters as input, the parameter values can be retrieved directly from memory 220.

Moreover, the present technology can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

The software may be realized as a computer program product, which is normally carried on a non-transitory computer-readable medium, for example a CD, DVD, USB memory, hard drive or any other conventional memory device. The software may thus be loaded into the operating memory of a computer or equivalent processing system for execution by a processor. The computer/processor does not have to be dedicated to only execute the above-described steps, functions, procedure and/or blocks, but may also execute other software tasks.

The embodiments described above are to be understood as a few illustrative examples of the present technology. It will be understood by those skilled in the art that various modifications, combinations and changes may be made to the embodiments without departing from the scope of the present technology. In particular, different part solutions in the different embodiments can be combined in other configurations, where technically possible. The scope of the present technology is, however, defined by the appended claims.

APPENDIX

Ordinary Maximum Likelihood Discrete Wave Based Channel Estimation

As an example, a general formulation of a channel model can be expressed as $$\tilde{H}_{mn} = \sum_{l=1}^{N} g_m^{rx}(k_l^{rx})^T \cdot A_l \cdot g_n^{tx}(k_l^{tx}) \cdot \exp[i(k_l^{rx} \cdot r_m^{rx} - k_l^{tx} \cdot r_n^{tx} + \omega \tau_l)] \quad (1)$$

where $\tilde{H}_{mn}$ is the channel between transmit antenna n and receive antenna m, $A_l$ is the complex polarimetric amplitude matrix of the $l^{th}$ of totally N plane waves, $g_m^{rx}(k_l^{rx})$ and $g_n^{tx}(k_l^{tx})$ are the complex polarimetric antenna gain vectors for the corresponding wave vectors $k_l^{rx}$ and $k_l^{tx}$, $r_m^{rx}$ and $r_n^{tx}$ are the position vectors of the receive and transmit antenna elements relative to corresponding antenna reference points, $\omega$ is the angular frequency and $\tau_l$ is the wave propagation delay between the reference points. It should be noted that the model is wideband since the wave vectors and the angular frequency are valid for any radio frequency. In this example, the discrete waves are plane waves, but it should be understood that a corresponding model based on for example spherical waves can be designed.

The number $N_{tx}$ of transmit antennas can vary from 1 and up, and the number $N_{rx}$ of receive antennas can also vary from 1 and up: $N_{tx} \geq 1$, and $N_{rx} \geq 1$. The methodology is thus valid for Single-Input Single-Output (SISO), Single-Input Multiple-Output (SIMO), Multiple-Input Single-Output (MISO) and Multiple-Input Multiple-Output (MIMO) antenna cases.

The corresponding likelihood L is given by $$L = (\pi\sigma^2)^{-N_{rx}N_{tx}N_f} \prod_{m=1}^{N_{rx}} \prod_{n=1}^{N_{tx}} \prod_{k=1}^{N_f} \exp\left\{\frac{-\|\tilde{H}_{mnk} - H_{mnk}\|^2}{\sigma^2}\right\} \quad (2)$$

where k is the index over frequency samples, $N_f$ is the number of frequency samples, $H_{mnk}$ is the measured channel response, and $\sigma^2$ is the measurement noise power. In order to find the most probable set of plane waves, which would mimic the measured channel best, the likelihood is maximized with respect to the model parameters $A_l$, $k_l^{rx}$, $k_l^{tx}$ and $\tau_l$. The corresponding log-likelihood is $$-\log L = N_{rx}N_{tx}N_f \log(\pi\sigma^2) + \frac{1}{\sigma^2}\sum_{m=1}^{N_{rx}}\sum_{n=1}^{N_{tx}}\sum_{k=1}^{N_f} \|\tilde{H}_{mnk} - H_{mnk}\|^2. \quad (3)$$

Vectorizing the model $$\tilde{H}_{mnk} = \sum_{l=1}^{N} g_m^{rx}(k_{lk}^{rx})^T \cdot A_l \cdot g_n^{tx}(k_{lk}^{tx}) \cdot \exp[i(k_{lk}^{rx} \cdot r_m^{rx} - k_{lk}^{tx} \cdot r_n^{tx} + \omega_k \tau_l)] \quad (4)$$

gives $$\tilde{h}_q = \sum_{l=1}^{N} g_q^{rx}(k_{ql}^{rx})^T \cdot A_l \cdot g_q^{tx}(k_{ql}^{tx}) \cdot \exp[i(k_{ql}^{rx} \cdot r_q^{rx} - k_{ql}^{tx} \cdot r_q^{tx} + \omega_q \tau_l)] \quad (5)$$

or $$\tilde{h}_q = \sum_{l=1}^{N} \sum_{i=1}^{2} \sum_{j=1}^{2} g_{qi}^{rx}(k_{ql}^{rx}) \cdot A_{ijl} \cdot g_{qj}^{tx}(k_{ql}^{tx}) \cdot \exp[i(k_{ql}^{rx} \cdot r_q^{rx} - k_{ql}^{tx} \cdot r_q^{tx} + \omega_q \tau_l)] \quad (6)$$

where q accounts for m, n and k and $\tilde{h}_q = \tilde{H}_{mnk}$.

Defining $$B_{ql} = \exp[i(k_{ql}^{rx} \cdot r_q^{rx} - k_{ql}^{tx} \cdot r_q^{tx} + \omega_q \tau_l)] \quad (7)$$

gives $$\tilde{h}_q = \sum_{l=1}^{N} \sum_{i=1}^{2} \sum_{j=1}^{2} g_{qi}^{rx}(k_{ql}^{rx}) \cdot A_{ijl} \cdot g_{qj}^{tx}(k_{ql}^{tx}) \cdot B_{ql}. \quad (8)$$

The corresponding log likelihood is given by $$-\log L = N_{rx} N_{tx} N_f \log(\pi \sigma^2) + \frac{1}{\sigma^2} \sum_{q=1}^{N_q} (\tilde{h}_q - h_q)^* \cdot (\tilde{h}_q - h_q). \quad (9)$$

where * denotes the conjugate operator.

Differentiating the log likelihood with respect to the polarimetric amplitudes gives $$\frac{\partial (\log L)}{\partial (\text{Re}[A_{ijl}])} = \frac{2}{\sigma^2} \sum_{q=1}^{N_q} \text{Re}\left[ (\tilde{h}_q - h_q)^* \cdot g_{qi}^{rx}(k_{ql}^{rx}) \cdot g_{qj}^{tx}(k_{ql}^{tx}) \cdot B_{ql} \right] \quad (10)$$

and $$\frac{\partial (\log L)}{\partial (\text{Im}[A_{ijl}])} = \frac{2}{\sigma^2} \sum_{q=1}^{N_q} \text{Im}\left[ (\tilde{h}_q - h_q)^* \cdot g_{qi}^{rx}(k_{ql}^{rx}) \cdot g_{qj}^{tx}(k_{ql}^{tx}) \cdot B_{ql} \right]. \quad (11)$$

Re denotes the real part operator and Im denotes the imaginary part operator with respect to complex parameters having a real part and an imaginary part.

At the minimum the derivatives must vanish $$\sum_{q=1}^{N_q} \tilde{h}_q^* \cdot g_{qi}^{rx}(k_{ql}^{rx}) \cdot g_{qj}^{tx}(k_{ql}^{tx}) \cdot B_{ql} = \sum_{q=1}^{N_q} h_q^* \cdot g_{qi}^{rx}(k_{ql}^{rx}) \cdot g_{qj}^{tx}(k_{ql}^{tx}) \cdot B_{ql}. \quad (12)$$

Expanding the model $\tilde{h}^*_q$ gives $$\sum_{q=1}^{N_q} \sum_{u=1}^{N} \sum_{o=1}^{2} \sum_{p=1}^{2} g_{qo}^{rx}(k_{qu}^{rx})^* \cdot A_{opu}^* \cdot g_{qp}^{tx}(k_{qu}^{tx})^* \cdot B_{qu}^* \cdot g_{qi}^{rx}(k_{ql}^{rx}) \cdot g_{qj}^{tx}(k_{ql}^{tx}) \cdot B_{ql} = \quad (13)$$

$$\sum_{q=1}^{N_q} h_q^* \cdot g_{qi}^{rx}(k_{ql}^{rx}) \cdot g_{qj}^{tx}(k_{ql}^{tx}) \cdot B_{ql}$$

Vectorizing indices o, p and u using r gives $$C^*_{qr} = g_{qo}^{rx}(k_{qu}^{rx})^* \cdot g_{qp}^{tx}(k_{qu}^{tx}) \cdot B^*_{qu} \quad (14)$$

and $$\sum_{s=1}^{N_a} \sum_{q=1}^{N_q} a_s^* \cdot C_{qs}^* \cdot C_{qr} = \sum_{q=1}^{N_q} h_q^* \cdot C_{qr} \quad (15)$$

$$a^H \cdot C^H \cdot C = h^H \cdot C \quad (16)$$

$$a = (C^H \cdot C)^{-1} C^H \cdot h \quad (17)$$

where H denotes the Hermetian operator, $N_\alpha$ is the number of elements of a, and $\alpha_r = A_{opu}$.

In order to achieve positive definite $C^H \cdot C$ the antennas used must account for the full polarization matrix.

If this is not the case, the channel corresponding to the actual antenna polarizations may be used. It should be noted that different amplitudes $A'_{jl}$ corresponding to different antenna elements may not be orthogonal $$\tilde{h}_q = \sum_{l=1}^{N} \sum_{j=1}^{2} g_{qj}^{rx}(k_{ql}^{rx}) \cdot A'_{jl} \cdot g_{qj}^{tx}(k_{ql}^{tx}) \cdot B_{ql}. \quad (18)$$

The expression corresponding to (13) is $$\sum_{u=1}^{N} \sum_{o=1}^{2} \sum_{q=1}^{N_q} g_{qo}^{rx}(k_{qu}^{rx})^* \cdot A'^*_{ou} \cdot g_{qo}^{tx}(k_{qu}^{tx})^* \cdot B_{qu}^* \cdot g_{qj}^{rx}(k_{ql}^{rx}) \cdot g_{qk}^{tx}(k_{ql}^{tx}) \cdot B_{ql} = \quad (19)$$

$$\sum_{q=1}^{N_q} h_q^* \cdot g_{qj}^{rx}(k_{ql}^{rx}) \cdot g_{qj}^{tx}(k_{ql}^{tx}) \cdot B_{ql}$$

which may be vectorized in the same manner as above. It should be noted that (13) and (19) are in practice identical when $A'_{jl}$ corresponds to orthogonal antenna polarizations.

Although the examples are shown for plane wave estimation it should be understood that the techniques described herein are not limited to plane waves. It is for example possible to work with spherical waves.

Example of Modified/Windowed Likelihood Function

The likelihood function may be modified in order to reduce correlations between plane waves which are separated in delay and directional domains. This is achieved by introducing windowing. The modified/windowed log likelihood is given by $$-\log L_{mod} = \frac{1}{\sigma^2} \sum_{q=1}^{N_q} \|\tilde{h}'_q - h'_q\|^2 \quad (20)$$

where $$\tilde{h}'_q = \sum_{l=1}^{N} \sum_{i=1}^{2} \sum_{j=1}^{2} g^{rx}_{qi}(k^{rx}_{ql}) \cdot A_{ijl} \cdot g^{tx}_{qj}(k^{tx}_{ql}) \cdot B_{ql} \cdot w_q \quad (21)$$

and $w_q$ are the corresponding windowing weights and $$h'_q = w_q \cdot h_q. \quad (22)$$

In e.g. the delay domain an ordinary Hanning window may be used. Other examples of windows include a Blackman Harris window and a Gauss window. Normally, the window function is non-rectangular. Preferably, the window function is defined as a smooth bell-shaped curve, although other types of windows such as triangular windows are also feasible.

Now the corresponding expressions for (15), (16) and (17) are $$\sum_{s=1}^{N_a} \sum_{q=1}^{N_q} a^*_s \cdot C^*_{qs} \cdot C_{qr} \cdot w^2_q = \sum_{q=1}^{N_q} h^*_q \cdot C_{qr} \cdot w^2_q \quad (23)$$

where $$C'_{qr} = w_q \cdot C_{qr}, \quad (24)$$

$$a^H \cdot C'^H \cdot C' = h'^H \cdot C' \quad (25)$$

$$a = (C'^H \cdot C')^{-1} C'^H \cdot h'. \quad (26)$$

Example of Local Likelihood Maximization by Taylor Expansion

The quadratic Taylor expansion of the modified/windowed log likelihood function $$\log L_{mod} = -\frac{1}{\sigma^2} \sum_{m=1}^{N_{rx}} \sum_{n=1}^{N_{tx}} \sum_{k=1}^{N_f} \|\tilde{H}'_{mnk} - H'_{mnk}\|^2 \quad (27)$$

$$= -\frac{1}{\sigma^2} h'^H [I - C'(C'^H \cdot C')^{-1} C'^H] h'$$

is, defining $$M \equiv (C'^H \cdot C')^{-1}, \quad D_i \equiv \frac{\partial C'}{\partial \theta_i}, \quad D_{ij} \equiv \frac{\partial^2 C'}{\partial \theta_i \partial \theta_j} \quad (28)$$

where $\theta_i$ and $\theta_j$ here denote arbitrary, selectable parameters such as wave propagation direction(s) and/or wave propagation delay, and using $$\frac{\partial [I - C'MC'^H]}{\partial \theta_i} = C'M(D^H_i C' + C'^H D_i)MC'^H - D_i MC'^H - C'MD^H_i \quad (29)$$

and $$\frac{\partial^2 [I - C'MC'^H]}{\partial \theta_i \partial \theta_j} = D_i M(D^H_j C' + C'^H D_j)MC'^H + \quad (30)$$
$$C'M(D^H_j C' + C'^H D_j)D^H_i + D_j M(D^H_i C' + C'^H D_i)MC'^H +$$
$$C'M(D^H_i C' + C'^H D_i)D^H_j - D_{ij}MC'^H - C'MD^H_{ij} - D_i MD^H_j -$$
$$D_j MD^H_i - C'M(D^H_i C' + C'^H D_i)M(D^H_j C' + C'^H D_j)MC'^H -$$
$$C'M(D^H_j C' + C'^H D_j)M(D^H_i C + C'^H D_i)MC'^H -$$
$$C'M(D^H_j D_i + D^H_i D_j + D^H_{ij} C' + C'^H D_{ij})MC'^H$$

given by $$\frac{\partial \log L_{mod}}{\partial \theta_i} = 2\mathrm{Re}(h'^H [C'MD^H_i C'MC'^H - D_i MC'^H] h') \quad (31)$$

and $$\frac{\partial^2 \log L_{mod}}{\partial \theta_i \partial \theta_j} = \quad (32)$$

$$2\mathrm{Re}\left\{h'^H \begin{bmatrix} D_i M(D^H_j C' + C'^H D_j)MC'^H + \\ D_j M(D^H_i C' + C'^H D_i)MC'^H \\ -C'M(D^H_i C' + C'^H D_i)M(D^H_j C' + C'^H D_j)MC'^H \\ -C'M(D^H_j D_i + D^H_{ij} C')MC'^H - D_{ij}MC'^H - D_i MD^H_j \end{bmatrix} h'\right\}.$$

Close to a local minimum $L_{mod}$ is quadratic. Defining $$g \equiv \nabla \log L_{mod} \text{ and } G \equiv \nabla \cdot \nabla^T \log L_{mod} \quad (33)$$

results in the following correction for the parameter values $$\Delta\theta = G^{-1} g. \quad (34)$$

From this expression the covariance matrix for the true parameter values may be determined $$[\mathrm{cov}\Delta\theta]_{kl} = \left\langle G^{-1} g \cdot (gG^{-1})^T \right\rangle_{kl} = G^{-1}_{ki} \quad (35)$$

$$\left\{ \begin{array}{l} (h'_{true} + \varepsilon)^H \begin{bmatrix} C'MD^H_i C'MC'^H + C'MC'^H \\ D_i MC'^H - D_i MC'^H - C'MD^H_i \end{bmatrix} (h'_{true} + \varepsilon) \cdot \\ (h'_{true} + \varepsilon)^H \begin{bmatrix} C'MD^H_j C'MC'^H + C'MC'^H \\ D_j MC'^H - D_j MC'^H - C'MD^H_j \end{bmatrix} (h'_{true} + \varepsilon) \end{array} \right\} G^{-1}_{lj}$$

Defining $$O_i \equiv C'MD^H_i C'MC'^H + C'MC'^H D_i MC'^H - D_i MC'^H - C'MD^H_i \quad (36)$$

gives $$\langle (h'_{true} + \varepsilon)^H O_i (h'_{true} + \varepsilon) \cdot (h'_{true} + \varepsilon)^H O_j (h'_{true} + \varepsilon) \rangle = \quad (37)$$

$$\langle [\varepsilon^H O_i h'_{true} + h'^H_{true} O_i \varepsilon] \cdot [\varepsilon^H O_j h'_{true} + h'^H_{true} O_j \varepsilon] \rangle =$$

$$\sigma^2 ([h'^H_{true} O_j \cdot w^T] \cdot [w \cdot O_i h'_{true}] + [h'^H_{true} O_i \cdot w^T] \cdot [w \cdot O_j h'_{true}]) =$$

$$2\sigma^2 \mathrm{Re}\{[h'^H_{true} O_j \cdot w^T] \cdot [w \cdot O_i h'_{true}]\} =$$

$$8\sigma^2 \mathrm{Re}\{(h'^H_{true} \mathrm{Re}[O_j] \cdot w^T) \cdot (w \cdot \mathrm{Re}[O_i] h'_{true})\}$$

where ○ is the Hadamard product operator which corresponds to element wise multiplication, i.e. $(A \circ B)_{ij} \equiv (A)_{ij} \cdot (B)_{ij}$.

Examples of Effect of Windowing

In order to evaluate the effect of the windowing, w, simulations have been performed at 2.6 GHz with 19 MHz bandwidth. 191 frequency samples with 100 KHz spacing were used. A linear antenna array of 10 identical isotropic elements with 5.75 cm spacing was used. The model $$\tilde{h}'_q = \sum_{l=1}^{N} a_l \cdot B_{ql} \cdot w_q \qquad (38)$$

where $$B_{ql} = \exp[i(k_{ql}^{rx} \cdot r_q^{rx} + \omega_q \tau_l)]. \qquad (39)$$

and $$w_q = \cos^2\left(\pi \frac{f_q - \langle f \rangle}{\max(f) - \min(f) + 2\Delta f}\right) \qquad (40)$$

which is an ordinary Hanning window. The term $f_q$ represents a frequency sample, and $\langle f \rangle$ represents an average frequency. The amplitudes are $a_1 = a_2 = 1$, the propagation distances (delays) are $d_1 = d_2 = c\tau_1 = 400$ m and the elevation angles, here denoted $\xi_1 = \xi_2 = 0$ degrees. Only the azimuth angles, $\phi_1 = 0$ and $\phi_2 = 10$ degrees, are separated. It is assumed that a third interfering plane wave would not affect the accuracy on the estimated parameters of the two plane waves subject to parameter estimation if the interfering wave is sufficiently separated from these two waves in delay. This has been investigated for the third plane wave having equal parameter settings as the two estimated waves except for $d_3 = c\tau_3 = 400 \ldots 500$ m, $\phi_3 = -10$ degrees and $$a_3 = \sqrt{p} \exp\left(-2\pi i \frac{d_{sep}\langle f \rangle}{c}\right) \qquad (41)$$

where p is the corresponding power and $d_{sep}$ is the separation distance.

Figure 10B:
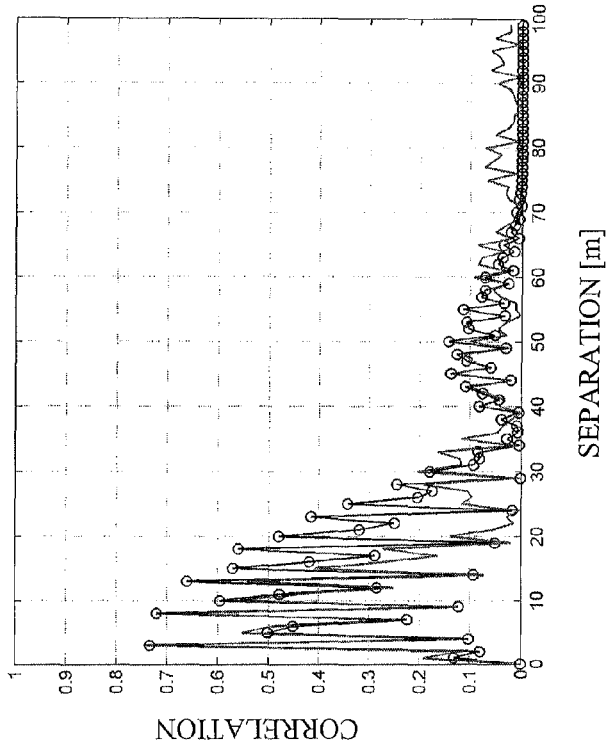
FIGS. 10A-B are schematic diagrams showing an example of the fact that the overlap in terms of power and correlation is clearly smaller for the modified/windowed likelihood function than for the ordinary likelihood function.
Figure 10A:
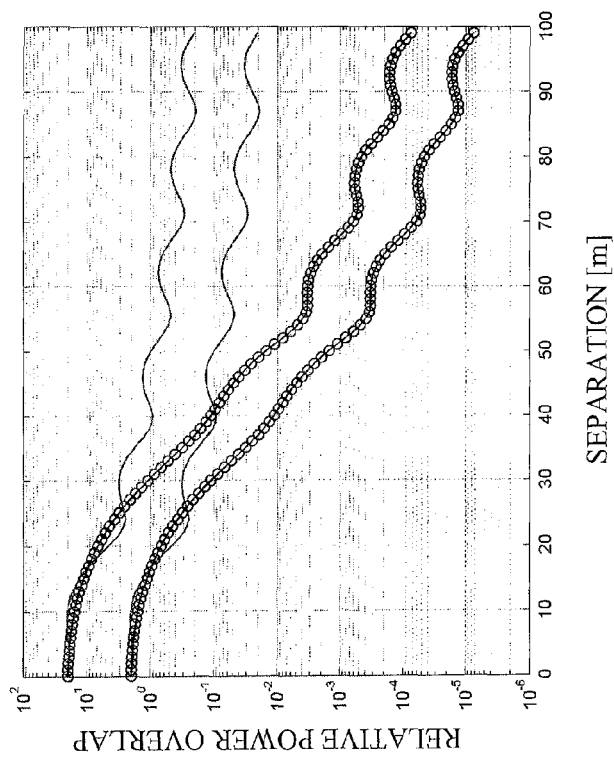

FIGS. 10A-B are schematic diagrams showing that the overlap in terms of power and correlation is clearly smaller for the modified/windowed likelihood function $L_{mod}$ than for the ordinary likelihood function L. FIG. 10A illustrates the relative power overlap for wave #1 with respect to wave #3 for p=2 and p=20. FIG. 10B illustrates the corresponding correlation of likelihood function for p=2 and p=20. The reason why the errors are larger for p=20 is only due to that the power overlap is larger since the correlation is unaffected.

Figure 11A:
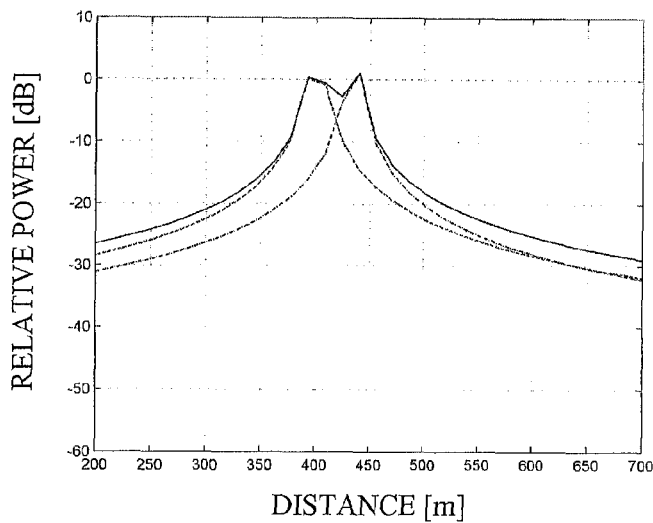
FIGS. 11A-C are schematic diagrams showing an example of average power delay profiles (PDP) and estimation errors for the modified likelihood and the ordinary likelihood for a first example, where
Figure 11B:
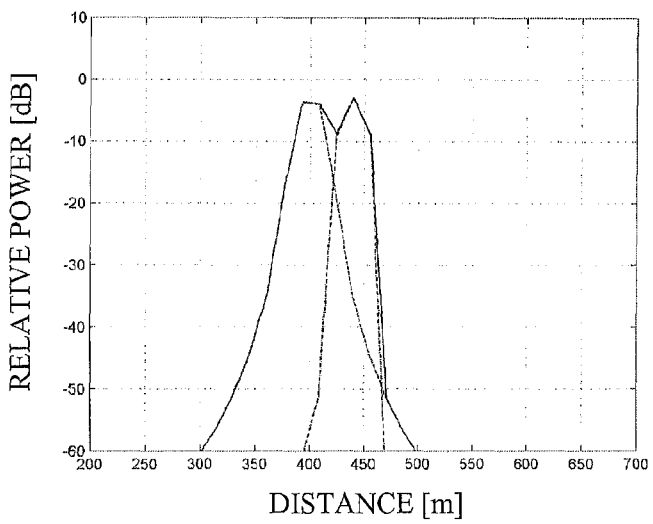
Figure 11C:
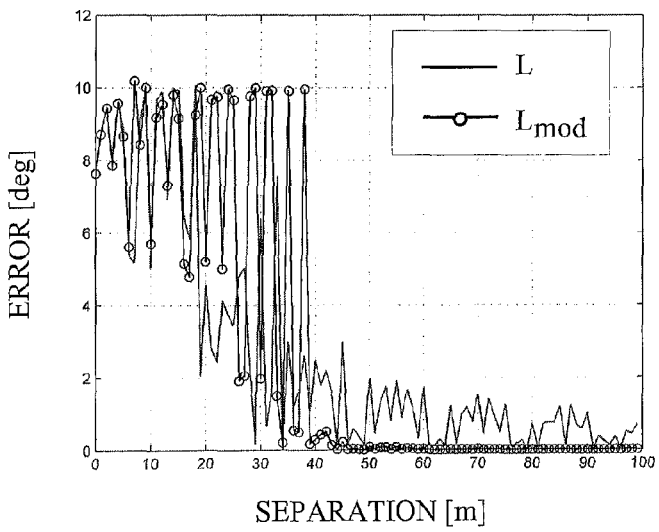
Figure 12A:
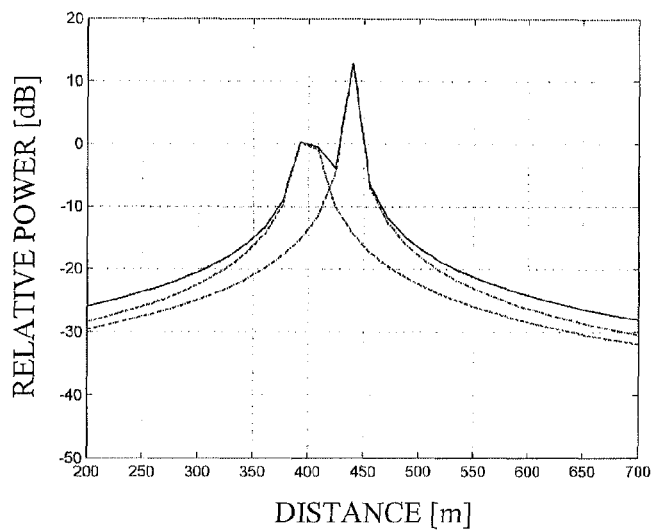
FIGS. 12A-C are schematic diagrams showing an example of average power delay profiles (PDP) and estimation errors for the modified likelihood and the ordinary likelihood for a second example, where
Figure 12B:
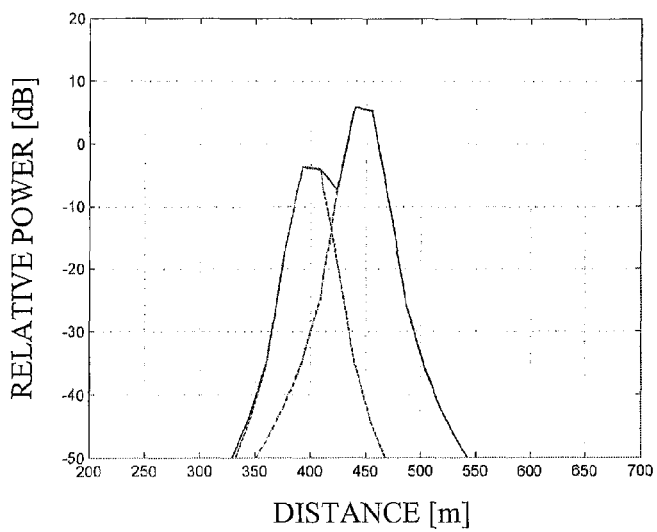
Figure 12C:
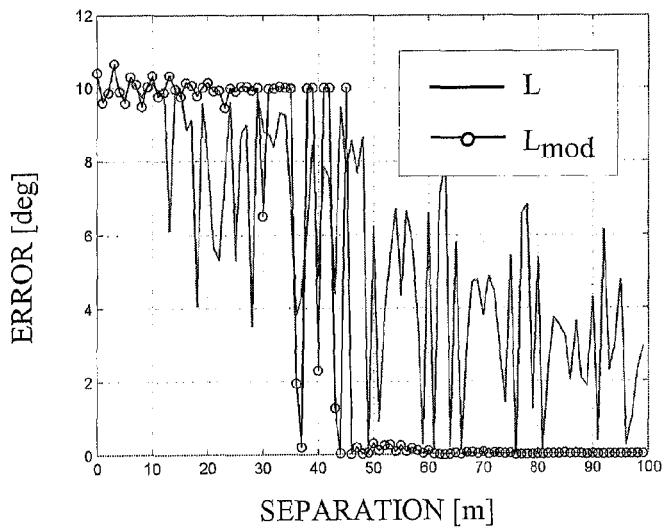

FIGS. 11A-C and FIGS. 12A-C are schematic diagrams showing the corresponding results for the modified likelihood $L_{mod}$ and the ordinary likelihood L for $\sigma^2 = 0$ (no receiver noise), for p=2 and p=20, respectively. FIGS. 11A and 12A illustrate the average power delay profiles (PDP) for L. FIGS. 11B and 12B illustrate the average power delay profiles (PDP) for $L_{mod}$. FIGS. 11C and 12C illustrate the estimation errors for angle $\phi_1$. FIGS. 11A-C illustrate the results for p=2 and FIGS. 12A-C illustrate the results for p=20.

In the power delay profiles the total sum (solid lines) and the sum of estimated waves (dashed) and the interfering wave (dash dotted) are shown for distances where two peaks are first visible.

The peaks of the average power delay profiles of the interfering wave and the two estimated waves may be separated visually for $d_{sep}$ values between 30 and 50 m. This corresponds to the distance where the estimated angle $\phi_1$ is reliable when $L_{mod}$ is used. The errors seem negligible for $d_{sep} > 60$ m.

In contrast to using the modified/windowed likelihood function $L_{mod}$, ordinary likelihood L results in large angle estimate errors even for large separation distances. If the interfering wave is strong (p=20), errors up to 6 degrees persist even for the largest separations. The reason for the difference in performance may be attributed to overlap of the peaks in delay domain which is significantly smaller when using windowing. The power overlap may be expressed $$P_{overlap} = \frac{\int P(\tau) P_{int}(\tau) d\tau}{\int P(\tau)^2 d\tau}. \qquad (42)$$

where $P(\tau)$ is a power delay profile of the wave to be estimated, $\tau$ is delay, and $P_{int}(\tau)$ is a power delay profile of an interfering wave.

It has been proposed to identify groups of waves which have low mutual correlations and to perform maximization of the likelihood with respect to parameters within one group at a time in sequence (like with SAGE) [1]. However, the present results show that it is not possible to find independent clusters of waves if windowing is not applied. Even if the correlation is low, as in the example of FIGS. 10A-B, the impact of the interfering waves may be sizable.

The convergence has been shown to be very slow for parameters which are not independent when the maximization is performed sequentially [1]. Estimating all waves simultaneously, which is the alternative option, is not computationally feasible either. It is therefore proposed to use a modified/windowed likelihood function in order to keep both the complexity low and the accuracy high.

Example of Reduction of Data Size by Clipping

The possibility to remove dependencies between waves which are separated in some degree of freedom, of the data set, suggests that the data set size may be reduced by clipping. Data which correspond to uncorrelated waves are removed by clipping, e.g. in the delay domain and/or the angle/direction domain. Since the computational complexity is proportional to the size of the data set, clipping constitutes an additional means for increasing the efficiency of parameter estimation.

As an example the clipping in delay domain may be performed as follows. The data consist of N=1000 equidistant samples in frequency domain. Transformation (e.g. Fourier transformation) is used to provide delay domain data. First the maximum of the peak at the distance 400 m is identified (see FIGS. 13A-B). In this particular example, Hanning windowing, given by (40), has been used.

The set of delay indices, S, to be used after clipping is given by $$S = \{j_{max} - n, j_{max} - n + 1, \ldots j_{max} + n\} \qquad (43)$$

where $j_{max}$ is the index of the peak maximum of the data in delay domain. In the example the clipping margin is n=4 and 12. The resulting window $w_{clipp}$ after clipping is given by $$w_{clipp} = |\mathit{fft}(\mathit{ifft}[w(S')])| \qquad (44)$$

where $$S' = \{1, 2, \ldots, n+1, N-n+1, N-n+2, \ldots, N\}. \qquad (45)$$

The corresponding frequencies are given by $$(f_{clipp})_k = (f)_1 + (k-1)\Delta f \cdot \frac{N}{N_{clipp}}. \quad (46)$$

Figure 13B:
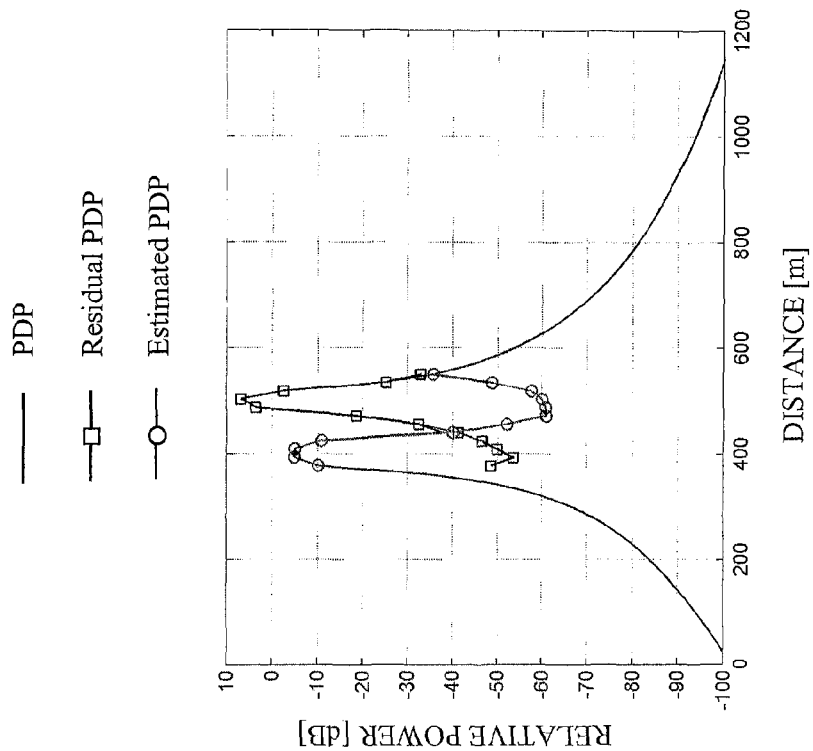
FIGS. 13A-B are schematic diagrams illustrating an example of simulated channel power delay profiles.
Figure 13A:
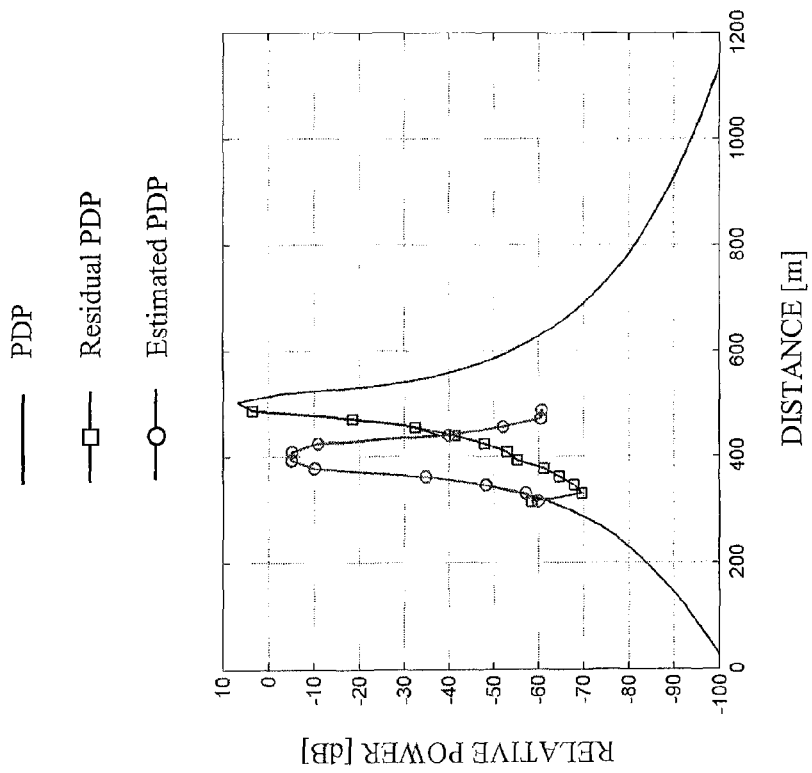

FIGS. 13A-B are schematic diagrams illustrating simulated channel power delay profiles. The original extent is shown in solid lines, and, the clipped estimated channel in solid lines with circles, and, the clipped residual in solid lines with squares. For the clipped data 12 delay samples have been used. FIG. 13A shows the case where the clipped peak is centered, and FIG. 13B shows the case where the peak is at the edge.

The clipped power delay profiles of FIGS. 13A-B correspond to a simulation case similar to the previous except that are $d_1$=390 and $d_2$=410 m. Moreover, only the case p=20 has been used. It is clear that both the estimated and the residual power delay profiles (PDPs) are accurate around the peaks. There is however some aliasing at the edges of the clipping window when the peak is off the center in delay of the clipped data.

Figure 14A:
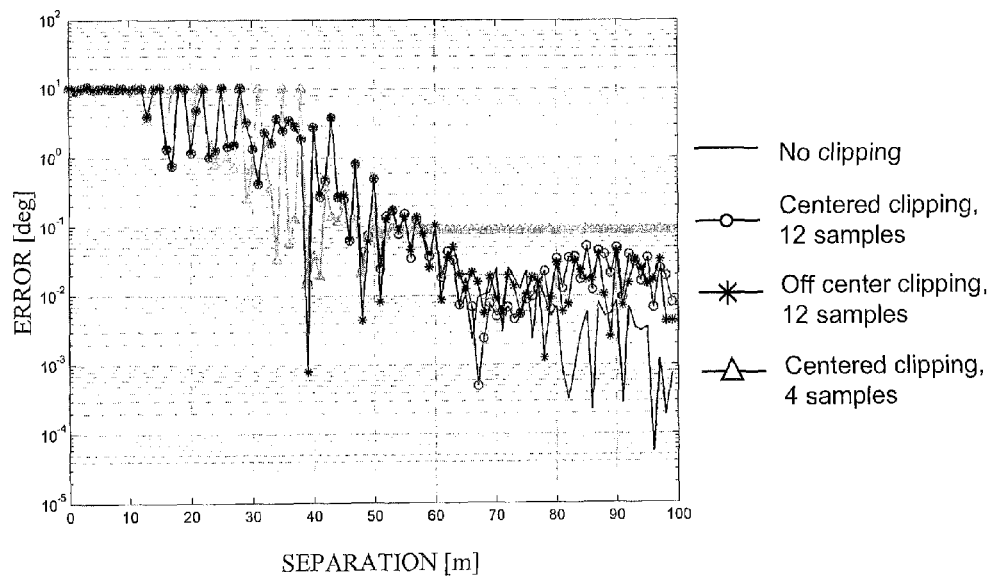
FIGS. 14A-B are schematic diagrams illustrating an example of estimation errors for different cases of clipped and non clipped power delay profiles.
Figure 14B:
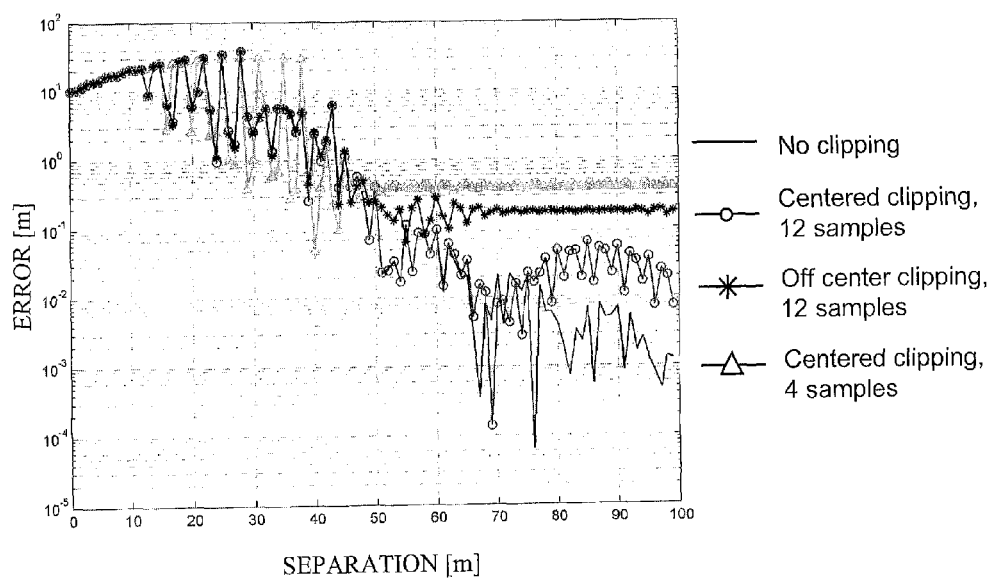

FIGS. 14A-B are schematic diagrams illustrating estimation errors for different cases of clipped and non clipped power delay profiles (see also FIGS. 13A-B). FIG. 14A shows an example of angle/direction errors and FIG. 14B shows an example of distance errors versus separation with respect to the interfering wave (cf. FIGS. 11A-C and FIGS. 12A-C).

It is clear from FIGS. 14A-B that the errors of estimated angles/directions and delays are sensitive neither to the size nor to the centering of the clipping window. Even using only four delay samples in the clipped data, results in as small distance and direction errors as 0.5 m and 0.1 degrees respectively. Off-center clipping does not seem to have any large impact on the estimation errors.

FIGS. 15A-B and FIGS. 16A-B are schematic diagrams illustrating the results of estimation of 15 synthesized waves. In this case 1601 equidistant frequency samples over 200 MHz bandwidth and a carrier frequency of 5.25 GHz is used. Moreover a planar antenna array of 10×25 elements ($N_{horizontal} \times N_{vertical}$), with 2 cm (0.35λ) spacing is used. Five clusters in delay, of three waves each having different angles, are synthesized mimicking the Ericsson brand symbol. In each cluster one wave has 0 dB and two waves −10 dB relative powers. Simultaneous parameter estimation of parameters within clusters in delay is performed.

Figure 16B:
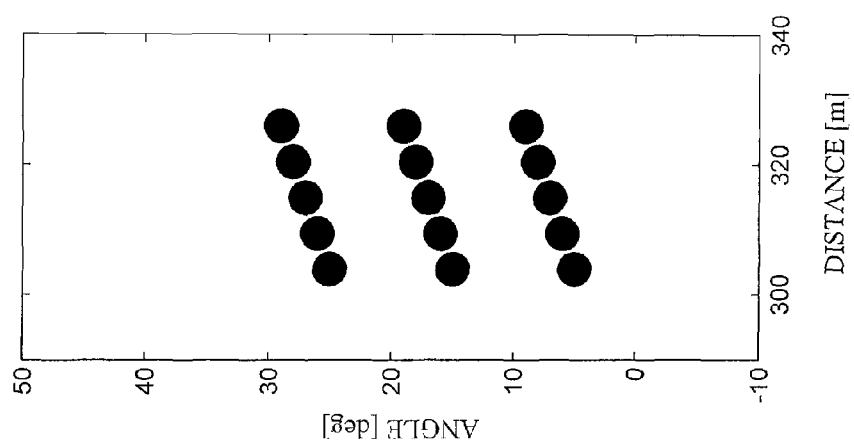
FIGS. 16A-B are schematic diagram illustrating an example of the results of estimation obtained from likelihood maximization.
Figure 16A:
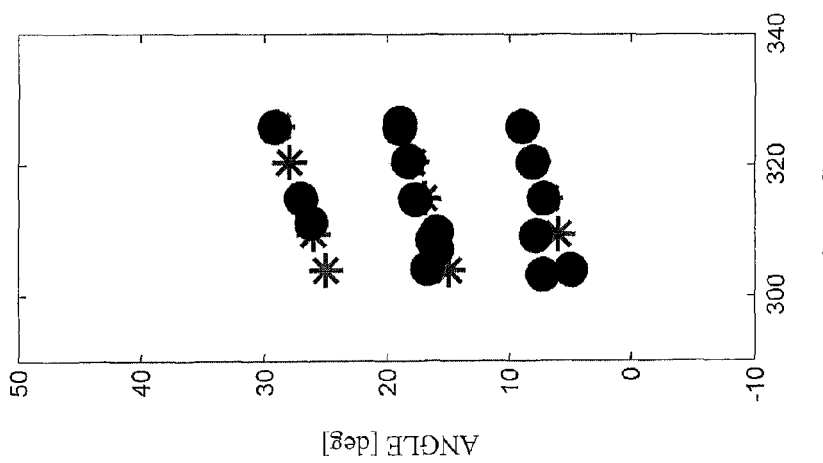

FIGS. 15A-B illustrate the initial results of beamforming and FIGS. 16A-B illustrate the corresponding estimates obtained from likelihood maximization. FIGS. 15A and 16A show the results of ordinary non-windowed maximum likelihood and FIGS. 15B and 16B show the results for modified/windowed maximum likelihood. It should be noted that the modified/windowed likelihood estimates (circles) of FIG. 16B matches the synthesized data (which can be seen as stars in FIG. 16A) exactly. It is clear that the modified/windowed maximum likelihood method estimates the angles and delays perfectly while there are significant errors with the traditional maximum likelihood.

Example of Overall Estimation Process

Figure 17:
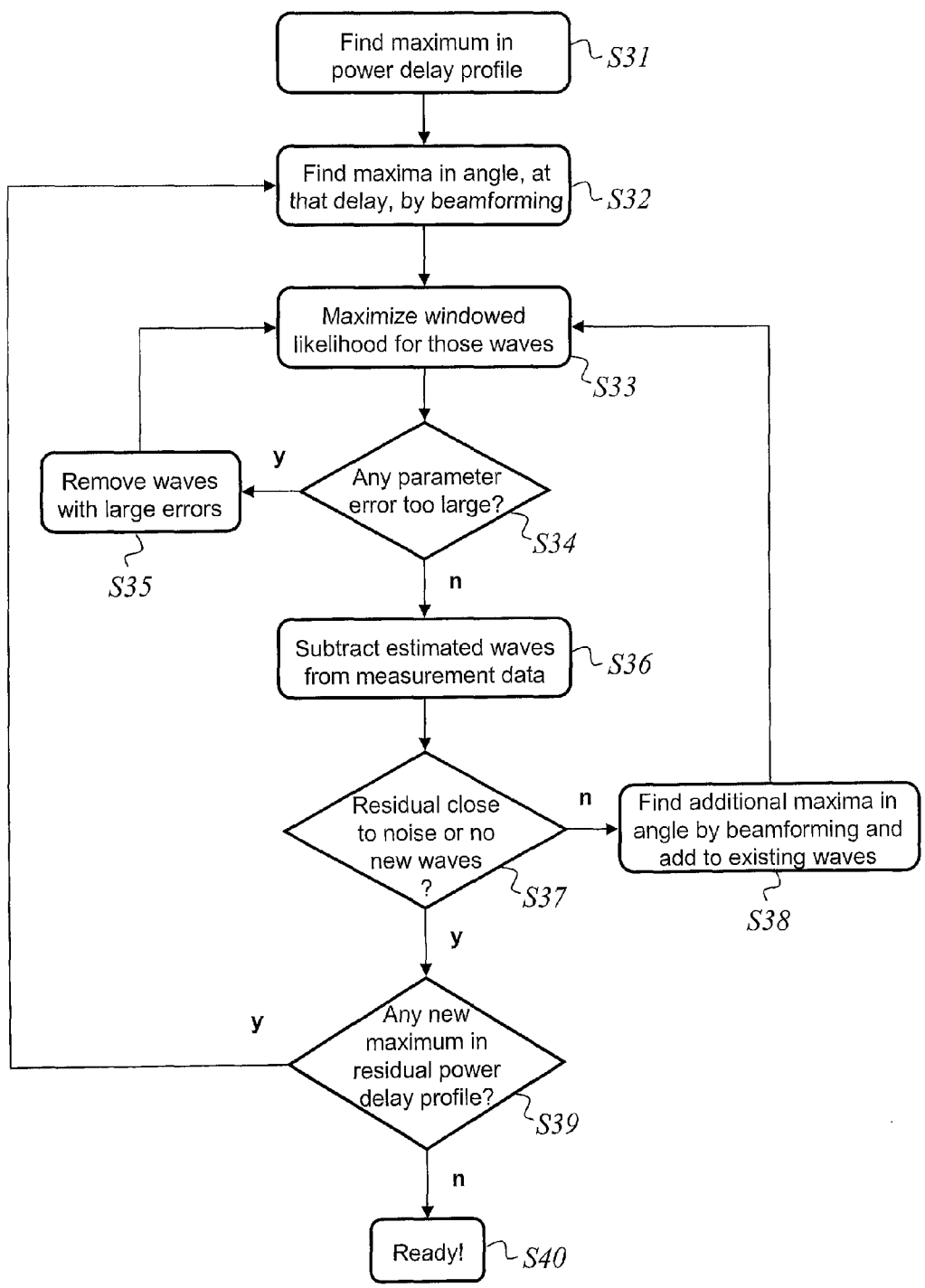
FIG. 17 is a schematic flow diagram illustrating an example of a typical overall estimation process.

An example of a typical overall estimation process is illustrated in FIG. 17. First a maximum in the windowed power delay profile is found in step S31. Alternatively, a maximum in the windowed power angle/direction profile is found. In this stage the data is averaged over the non windowed degrees of freedom. The data outside the maximum is then preferably clipped away. This means that the used data is local around the power maximum.

In order to keep high computational efficiency, a good guess of the initial parameter values is desirable. For this purpose any rough estimation technique can be used. For example, beamforming (corresponds to Discrete Fourier Transformation in the frequency domain) is performed providing an angle/direction power function. In step S32, a number of maxima in angle/direction are found at delay that corresponds to the maximum of the power delay profile previously found in step S31. Alternatively, if a maximum in the windowed power angle/direction profile was previously found in step S31, a delay power function is now defined and a number of maxima in delay are found in step S32. Each local maximum of this function, which is above the noise level, corresponds to an initial wave. In this stage the measured channel is windowed also for the domains (space and/or frequency) which are not clipped in order to avoid fake initial waves. However, this windowing is not applied in any other steps.

The initial values of the waves are then used as initial input in the maximization of the windowed likelihood function so that the windowed likelihood is maximized for those waves in step S33.

After maximization the parameter errors are checked in step S34 using equation (37). Waves having too large parameter errors (y) are removed in step S35 and the maximization of step S33 is repeated. When the parameter errors are acceptable (n) the estimated waves (modeled channel corresponding to those waves) are subtracted from the measurement data in step S36.

In step S37, it is investigated whether the residual measurement data is close to the noise threshold or there are no new waves. If the residual is above the noise threshold (n) additional maxima are identified, e.g. by beamforming, and added to the existing waves in step S38. Then the maximization of step S33 is repeated keeping the window around the already identified power maximum. If the residual measurement data is close to the noise level and/or no new rays have been added (y) a search for new maximum/peak(s) in delay or angle/direction in the residual power delay profile or power angle/direction profile is performed in step S39. For any new peak(s) (y) the previous procedure of steps S32-S39 is repeated. When there are no remaining new maximum/peak(s) the estimation process is finished and the overall estimation procedure is ready in step S40.

Example of Maximization of Modified/Windowed Likelihood

Figure 18:
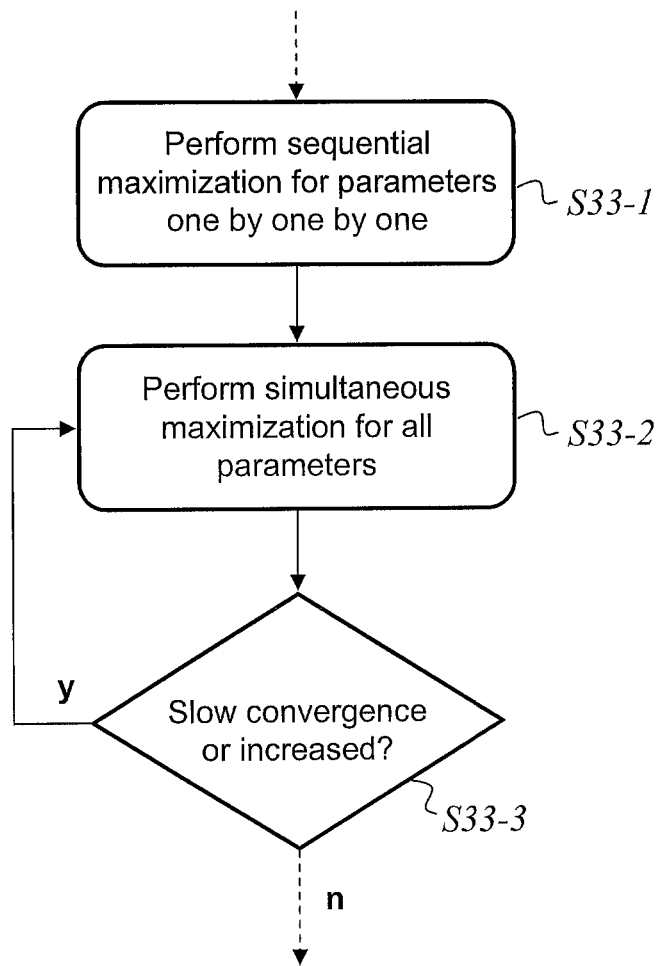
FIG. 18 is a schematic flow diagram illustrating an example of a multi-stage maximization process.

As previously mentioned the maximization of the modified/windowed likelihood function, $L_{mod}$, is preferably performed locally due to the windowing and/or clipping. The initial values might be at a larger distance from the maximum of $L_{mod}$ than the distances for which the quadratic Taylor expansion is valid. For this reason it may be beneficial to introduce a first step S33-1 where $L_{mod}$ is maximized relative to one parameter at a time as shown in the example of FIG. 18 (cf. SAGE in [1]). In the next step S33-2 modified/windowed likelihood maximization is applied, e.g. using a windowed likelihood function $L_{mod}$ that is approximated with up to quadratic Taylor expansion terms. For this expansion the maximum is given in closed form. A number of iterations of step S33-2 may be needed until the search has converged as decided in step S33-3. If the convergence is slow or if $L_{mod}$ mod has increased the sequential step S33-1 may also be repeated, always keeping the parameter values giving the largest modified/windowed likelihood. It should be understood that other methods may be applied for the simultaneous stage/step S33-2. For example: Steepest Descent Method, Newton-Raphson Method, Gauβ-Newton Method and Levenberg-Marquardt Method [1]. In fact, the maximization of the windowed likelihood function may be performed by means of any standard multivariate function maximization technique.

REFERENCES

[1] Andreas Richter, "Estimation of Radio Channel Parameters: Models and Algorithms," Doctoral Thesis, ISBN 3-938843-02-0, © Verlag ISLE 2005.
[2] Dave Laurenson and Peter Grant, "A Review of Radio Channel Sounding Techniques", EUSIPCO, Florence, Italy, Sep. 4-8, 2006, © EURASIP.
[3] Fredric J. Harris, "On the Use of Windows for Harmonic Analysis with the Discrete Fourier Transform", Proceedings of the IEEE, Vol. 66, No. 1, January 1978.

The invention claimed is:

1. A method of channel estimation based on a discrete wave channel model and measured channel responses between a transmitter having at least one transmit antenna and a receiver having at least one receive antenna, said method comprising the steps of:
determining a windowed likelihood function based on said measured channel responses, a selected window function, and modeled channel responses defined based on a number of discrete waves according to said discrete wave channel model, each one of said discrete waves being associated with wave parameters to be determined including at least one of wave propagation direction(s) and wave propagation delay;
performing maximization of said windowed likelihood function, using initial input in the form of at least one of predetermined wave propagation delay(s) and predetermined wave propagation direction(s) for at least one of said discrete waves, to determine the wave parameters of said discrete waves.

2. The method of claim 1, wherein said windowed likelihood function $L_{mod}$ is determined by one of the following functions:

$$-\log L_{mod} = \frac{1}{\sigma^2} \sum_{q=1}^{N_q} \left\| \tilde{h}_q \cdot w_q - h_q \cdot w_q \right\|^2,$$

$$-\log L_{mod} = \frac{1}{\sigma^2} \sum_{q=1}^{N_q} \left\| (\tilde{h}_q - h_q) \cdot w_q \right\|^2,$$

$$-\log L_{mod} = \frac{1}{\sigma^2} \sum_{q=1}^{N_q} \left\| \tilde{h}_q - h_q \right\|^2 \cdot w_q^2,$$

where $\tilde{h}_q$ denotes said modeled channel responses defined based on said wave parameters according to said discrete wave channel model, $h_q$ denotes said measured channel responses, $\sigma^2$ is measurement noise power, $N_q$ is the number of measured channel responses, and $w_q$ are windowing weights of said window function.

3. The method of claim 1, wherein said measured channel responses are windowed according to said window function to produce windowed measured channel responses, and said initial input in the form of at least one of predetermined wave propagation delay(s) and predetermined wave propagation direction(s) for at least one of said discrete waves is determined based on said windowed measured channel responses.

4. The method of claim 3, wherein said modeled channel responses are windowed according to said window function to produce windowed modeled channel responses, and said windowed likelihood function is determined based on said windowed measured channel responses and said windowed modeled channel responses.

5. The method of claim 3, wherein samples of said windowed measured channel responses are clipped to produce remaining windowed measured channel responses, and said initial input in the form of at least one of predetermined wave propagation delay(s) and predetermined wave propagation direction(s) for at least one of said discrete waves is determined based on said remaining windowed measured channel responses.

6. The method of claim 5, wherein said modeled channel responses are windowed according to said window function to produce windowed modeled channel responses, and said windowed likelihood function is determined based on said remaining windowed measured channel responses and windowed modeled channel responses corresponding to said remaining windowed measured channel responses.

7. The method of claim 5, wherein said remaining windowed measured channel responses are produced by clipping samples of said windowed measured channel responses that are decoupled with respect to the wave(s) at said predetermined wave propagation delay(s) and/or predetermined wave propagation direction(s).

8. The method of claim 7, wherein said windowed measured channel responses are transformed from the frequency domain into the delay domain, and said clipping is performed in the delay domain, and said remaining windowed measured channel responses are transformed from the delay domain back to the frequency domain.

9. The method of claim 7, wherein said windowed measured channel responses are transformed from the space domain into the direction domain, and said clipping is performed in the direction domain, and said remaining windowed measured channel responses are transformed from the direction domain back to the space domain.

10. The method of claim 1, wherein said window function is defined as a bell-shaped curve.

11. The method of claim 1, wherein said wave parameters, for each of said discrete waves, further includes a complex polarimetric amplitude matrix.

12. The method of claim 1, wherein said windowed likelihood function is approximated by a Taylor expansion thereof comprising terms up to and including second order terms before performing maximization of said windowed likelihood function.

13. The method of claim 1, wherein said maximization of said windowed likelihood function is performed by means of any standard multivariate function maximization technique.

14. The method of claim 1, wherein said initial input in the form of at least one of predetermined wave propagation delay(s) and predetermined wave propagation direction(s) corresponds to a local maximum of a power profile estimated with respect to at least one of the wave propagation delay and the wave propagation direction(s).

15. A channel estimator configured to operate based on a discrete wave channel model and measured channel responses between a transmitter having at least one transmit antenna and a receiver having at least one receive antenna, said channel estimator comprising:
a windowed likelihood determiner configured to determine a windowed likelihood function based on said measured channel responses, a selected window function, and modeled channel responses defined based on a number of discrete waves according to said discrete wave channel model, each one of said discrete waves being associated with wave parameters to be determined including at least one of wave propagation direction(s) and wave propagation delay;

a maximization processor configured to perform maximization of said windowed likelihood function, using initial input in the form of at least one of predetermined wave propagation delay(s) and predetermined wave propagation direction(s) for at least one of said discrete waves, to extract the wave parameters of said discrete waves.

16. The channel estimator of claim 15, wherein said windowed likelihood determiner is configured to determine said windowed likelihood function $L_{mod}$ by one of the following functions:

$$-\log L_{mod} = \frac{1}{\sigma^2} \sum_{q=1}^{N_q} \|\tilde{h}_q \cdot w_q - h_q \cdot w_q\|^2,$$

$$-\log L_{mod} = \frac{1}{\sigma^2} \sum_{q=1}^{N_q} \|(\tilde{h}_q - h_q) \cdot w_q\|^2,$$

$$-\log L_{mod} = \frac{1}{\sigma^2} \sum_{q=1}^{N_q} \|\tilde{h}_q - h_q\|^2 \cdot w_q^2,$$

where $\tilde{h}_q$ denotes said modeled channel responses defined based on said wave parameters according to said discrete wave channel model, $h_q$ denotes said measured channel responses, $\sigma^2$ is measurement noise power, $N_g$ is the number of measured channel responses, and $w_q$ are windowing weights of said window function.

17. The channel estimator of claim 15, wherein said channel estimator comprises a windower configured to window said measured channel responses according to said window function to produce windowed measured channel responses, and an initializer configured to determine said initial input in the form of at least one of predetermined wave propagation delay(s) and predetermined wave propagation direction(s) for at least one of said discrete waves based on said windowed measured channel responses.

18. The channel estimator of claim 17, wherein said windowed likelihood determiner is configured to window said modeled channel responses according to said window function to produce windowed modeled channel responses, and determine said windowed likelihood function based on said windowed measured channel responses and said windowed modeled channel responses.

19. The channel estimator of claim 17, wherein said channel estimator comprises a clipper configured for clipping samples of said windowed measured channel responses to produce remaining windowed measured channel responses, and said initializer is configured to determine said initial input in the form of at least one of predetermined wave propagation delay(s) and predetermined wave propagation direction(s) for at least one of said discrete waves based on said remaining windowed measured channel responses.

20. The channel estimator of claim 19, wherein said windowed likelihood determiner is configured to window said modeled channel responses according to said window function to produce windowed modeled channel responses, and to determine said windowed likelihood function based on said remaining windowed measured channel responses and windowed modeled channel responses corresponding to said remaining windowed measured channel responses.

21. The channel estimator of claim 19, wherein said clipper is configured for clipping samples of said windowed measured channel responses that are decoupled with respect to the wave(s) at said predetermined wave propagation delay(s) and/or predetermined wave propagation direction(s).

22. The channel estimator of claim 15, wherein said maximization processor is configured to extract, for each of the discrete waves, a complex polarimetric amplitude matrix that is also included in said wave parameters.

23. The channel estimator of any of the claim 15, wherein said windowed likelihood determiner is configured to approximate the windowed likelihood function by a Taylor expansion thereof comprising terms up to and including second order terms.

24. A unit comprising a channel estimator according to claim 15.

25. The unit of claim 24, wherein said unit is a base station.

26. The unit of claim 24, wherein said unit is a channel sounding equipment.

27. The unit of claim 24, wherein said unit is a user equipment.

* * * * *